US008135533B2

(12) United States Patent  
Noda

(10) Patent No.: US 8,135,533 B2
(45) Date of Patent: Mar. 13, 2012

(54) ELECTRONIC ENGINE CONTROL APPARATUS HAVING IMPROVED CONFIGURATION FOR ENSURING EXCELLENT ENGINE STARTABILITY

(75) Inventor: Yoshihiro Noda, Ichinomiya (JP)

(73) Assignee: Denso Corporation, Kariya (JP)

(*) Notice: Subject to any disclaimer, the term of this patent is extended or adjusted under 35 U.S.C. 154(b) by 1099 days.

(21) Appl. No.: 12/007,481

(22) Filed: Jan. 10, 2008

(65) Prior Publication Data

US 2008/0172164 A1 Jul. 17, 2008

(30) Foreign Application Priority Data

Jan. 15, 2007 (JP) ................................ 2007-006318

(51) Int. Cl.
*G06F 19/00* (2011.01)
(52) U.S. Cl. ......... 701/102; 701/99; 701/101; 701/29.1; 701/33.4; 717/168; 717/169; 717/170; 711/101; 711/102; 711/103; 711/104
(58) Field of Classification Search ............... 701/29, 701/31, 32, 33, 34, 35, 99, 101, 102; 717/168, 717/169, 170; 711/101, 102, 103, 104
See application file for complete search history.

(56) References Cited

U.S. PATENT DOCUMENTS

| 5,970,251 | A * | 10/1999 | Zimmermann et al. | 717/168 |
| 6,430,662 | B1 * | 8/2002 | Hurich et al. | 711/162 |
| 6,598,114 | B2 * | 7/2003 | Funakoshi | 711/103 |
| 6,604,194 | B1 | 8/2003 | Nam | |
| 6,643,572 | B2 * | 11/2003 | Kohge et al. | 701/41 |
| 7,404,028 | B2 * | 7/2008 | Baltes | 711/103 |
| 2006/0090159 | A1 * | 4/2006 | Kondo | 717/168 |
| 2006/0200618 | A1 * | 9/2006 | Fujita et al. | 711/103 |
| 2006/0259207 | A1 * | 11/2006 | Natsume | 701/1 |
| 2006/0259208 | A1 * | 11/2006 | Ota | 701/1 |

(Continued)

FOREIGN PATENT DOCUMENTS

EP 1 560 446 8/2005

(Continued)

OTHER PUBLICATIONS

Japanese Office Action dated Jan. 6, 2009, issued in corresponding Japanese Application No. 2007-006318, with English translation.

(Continued)

*Primary Examiner* — Thomas Black
*Assistant Examiner* — Peter D Nolan
(74) *Attorney, Agent, or Firm* — Nixon & Vanderhye P.C.

(57) ABSTRACT

An electronic engine control apparatus includes a first storage unit, a second storage unit, a third storage unit, and a processor. The processor performs, when the control apparatus is activated, an initialization control process which includes processes of; extracting from the first storage unit specific information on engine control software stored in the first storage unit; determining whether the specific information extracted is coincident with specific information stored in the third storage unit; initializing retention data stored in the second storage unit when the specific information extracted from the first storage unit is determined as being incoincident with that stored in the third storage unit; and updating the specific information stored in the third storage unit with that extracted from the first storage unit after completion of the initializing process. Further, the processor starts performing the process of executing the engine control software before completion of the initialization control process.

20 Claims, 15 Drawing Sheets

U.S. PATENT DOCUMENTS

| | | | |
|---|---|---|---|
| 2007/0005204 A1* | 1/2007 | Yamamoto et al. | 701/35 |
| 2007/0005873 A1* | 1/2007 | Baltes | 711/103 |

FOREIGN PATENT DOCUMENTS

| | | |
|---|---|---|
| JP | 2000-259420 | 9/2000 |
| JP | 2002-149412 | 5/2002 |
| JP | 2002-149432 | 5/2002 |
| JP | 2006-063939 | 3/2006 |
| JP | 2006-118386 | 5/2006 |
| JP | 2006-301960 | 11/2006 |
| WO | WO 00/77640 | 12/2000 |

OTHER PUBLICATIONS

Extended European Search Report dated May 8, 2009, issued in corresponding European Application No. 08000493.0-1243.

* cited by examiner

FIG. 4
BEFORE REWRITE PROCESSES
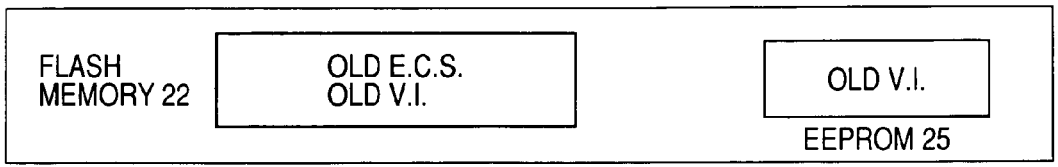
AFTER REWRITE PROCESSES
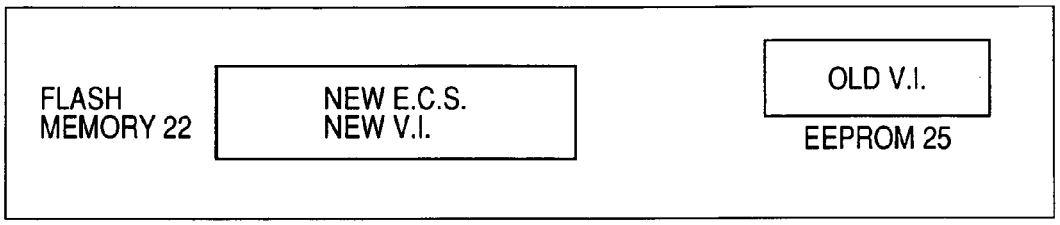
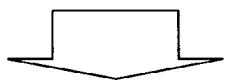
IN FIRST ACTIVATION
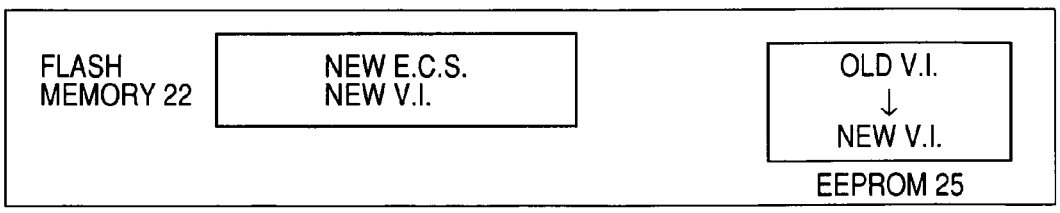
IN SECOND AND SUBSEQUENT ACTIVATIONS
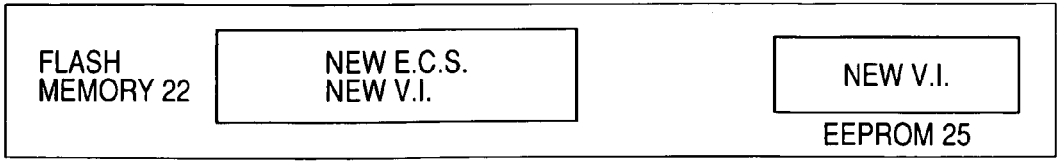

ELECTRONIC ENGINE CONTROL APPARATUS HAVING IMPROVED CONFIGURATION FOR ENSURING EXCELLENT ENGINE STARTABILITY

CROSS-REFERENCE TO RELATED APPLICATION

This application is based on and claims priority from Japanese Patent Application No. 2007-6318, filed on Jan. 15, 2007, the content of which is hereby incorporated by reference in its entirety into this application.

BACKGROUND OF THE INVENTION

1. Technical Field of the Invention

The present invention relates generally to electronic control apparatus which can on-board rewrite software therein. More particularly, the invention relates to an electronic engine control apparatus for controlling an engine of a motor vehicle, which can on-board rewrite engine control software therein and have an improved configuration for ensuring excellent startability of the engine.

2. Description of the Related Art

A conventional electronic control apparatus for controlling an engine of a motor vehicle includes a first storage means that is made up of an electrically rewritable and nonvolatile memory, such as a flash memory or an EEPROM (Electrically Erasable Programmable Read-Only Memory). The electronic control apparatus stores in the first storage means engine control software which consists of programs and data for controlling the engine. Further, the electronic control apparatus can on-board rewrite (i.e., rewrite in an on-board condition where the first storage means remain installed in the apparatus) the engine control software in response to a rewrite request from an external apparatus. (A reference can be made, for example, to Japanese Patent Application Publication No. 2002-149432.)

In such an electronic control apparatus, among data which is generated by executing the engine control software, retention data is stored in a second storage means which can retain its contents when power to the electronic control apparatus is removed. The second storage means may be made up of, for example, a power-backed up RAM or an electrically rewritable and nonvolatile memory. The retention data denotes, hereinafter, data that has to be retained in the electronic control apparatus even when power supply to the apparatus is stopped. The retention data may include, for example, learning values and diagnostic information (or diagnostic codes).

Moreover, when the engine control software is rewritten in the first storage means, the algorithm of that part of the engine control software which uses or updates the retention data is accordingly changed. Therefore, in such a case, it is necessary to initialize the retention data in the second storage means.

To this effect, in the electronic control apparatus disclosed in Japanese Patent Application Publication No. 2002-149432, the content of an update mark stored in the first storage means is changed from "not-updated" to "updated" in the process of rewriting the engine control software. Further, when the electronic control apparatus is activated upon turning on an ignition switch, the content of the update mark is checked. If it is checked out as being "updated", then the retention data is initialized in the second storage means and the update mark is changed backed to "not-updated".

With the above configuration, the retention data is initialized only in the first activation of the electronic control apparatus after the process of rewriting the engine control software; in the second and subsequent activations after the process of rewriting, the retention data stored in the second storage means is continuously utilize without initialization.

On the other hand, when the engine control software stored in the first storage means is rewritten with completely-identical engine control software, it is unnecessary to initialize the retention data in the second storage means. However, with the above configuration, the retention data will be initialized even in such a case.

Such a problem of unnecessary initialization can be solved in light of, for example, an electronic control apparatus disclosed in Japanese Patent Application Publication No. 2000-259420. In the disclosed electronic control apparatus, a first check code storage means stores a first check code corresponding to a control program through execution of which learning values (i.e., retention data) currently stored in a learning value storage means (i.e., the second storage means) have been generated, while a second check code storage means stores a second check code corresponding to a control program that is currently stored in a control program storage means (i.e., the first storage means). When the electronic control apparatus is activated upon turning on an ignition switch, a comparison is made between the first and second check codes. When the two check codes are checked out as being incoincident with each other, it is determined that the current learning values are no longer available and thus have to be initialized in the learning value storage means. After initialization of the learning values, the first check code stored in the first check code storage means is updated with the second check code stored in the second check code storage means. Then, the control program stored in the control program storage means is executed to control an engine of a motor vehicle.

With the above configuration, however, since the execution of the control program starts only after the processes of check code comparison, learning value initialization, and check code update, there will be a delay in initiating control of the engine, making it difficult to immediately start the engine. More specifically, after the electronic control apparatus is activated upon turning on the ignition switch, a starter switch is turned on to start the engine. However, for the above reason, engine control operations including fuel injection will be started only after a certain time period from the turning on of the starter switch, resulting in a delay in starting the engine. This delay will provide an uncomfortable feeling to the driver of the vehicle. In particular, in the case of the learning value storage means being made up of an EEPROM, the time required to initialize the learning values in the EEPROM will be long, thus making the delay remarkable.

SUMMARY OF THE INVENTION

The present invention has been made in view of the above-mentioned problems.

It is, therefore, a primary object of the present invention to provide an electronic control apparatus for controlling an engine of a motor vehicle, which can on-board rewrite engine control software therein, initialize retention data only when necessary, and ensure excellent startability of the engine.

According to one aspect of the present invention, there is provided an electronic control apparatus which includes: a first storage means which is electrically rewritable and nonvolatile and in which engine control software for controlling an engine of a motor vehicle is stored; a second storage means whose contents are retainable when power to the electronic control apparatus is removed; and a processor. The processor performs processes of: executing the engine control software stored in the first storage means to control the engine; storing in the second storage means retention data that is generated through execution of the engine control software and to be retained even when power to the electronic control apparatus is removed; and rewriting the engine control software stored in the first storage means with engine control software sent from an external upon receipt of a rewrite request from the external.

Moreover, the electronic control apparatus further includes a third storage means whose contents are retainable when power to the electronic control apparatus is removed and in which a piece of specific information on the engine control software is stored. The processor further performs, when the electronic control apparatus is activated, an initialization control process which includes processes of: extracting a piece of specific information on the engine control software from the first storage means; determining whether or not the piece of specific information extracted from the first storage means is coincident with that stored in the third storage means; initializing the retention data stored in the second storage means when the piece of specific information extracted from the first storage means is determined as being incoincident with that stored in the third storage means; and updating the piece of specific information stored in the third storage means with that extracted from the first storage means after completion of the initializing process.

Furthermore, in the electronic control apparatus, the processor starts performing the process of executing the engine control software stored in the first storage means before completion of the initialization control process.

With the above configuration, it is possible for the electronic control apparatus to on-board rewrite the engine control software in the first storage means, initialize the retention data in the second storage means only when necessary, and ensure excellent startability of the engine.

In one preferred embodiment, when the electronic control apparatus is activated, the processor starts performing the process of executing the engine control software in parallel with the initialization control process.

In another preferred embodiment, in the initializing process, the processor first initializes engine start control data that is a part of the retention data and necessary for controlling start of the engine. When the piece of specific information extracted from the first storage means is determined in the determining process as being incoincident with that stored in the third storage means, the processor starts performing the process of executing the engine control software in parallel with the initialization control process upon completion of the initialization of the engine start control data. When the piece of specific information extracted from the first storage means is determined in the determining process as being coincident with that stored in the third storage means, the processor starts performing only the process of executing the engine control software upon completion of the determining process.

The piece of specific information may be version information indicating a version of the engine control software. In this case, in the rewriting process, the processor also rewrites in the first storage means the version information on the engine control software stored in the first storage means with version information indicating a version of the engine control software sent from the external; in the extracting process, the processor extracts from the first storage means the version information on the engine control software as the piece of specific information.

Otherwise, the piece of specific information may be a specific value to the engine control software. In this case, in the extracting process, the processor determines the specific value by performing a predetermined computation on data that is included in a specific area of the engine control software, and retrieves the determined specific value as the piece of specific information.

In yet another preferred embodiment, the electronic control apparatus further includes one or more third storage means in each of which a piece of specific information on the engine control software is stored. The processor determines, in the determining process, whether the piece of specific information extracted from the first storage means is incoincident with at least one of the pieces of specific information stored in all the third storage means. When the piece of specific information extracted is determined as being incoincident with at least one of the pieces of specific information stored, the processor initializes, in the initializing process, the retention data stored in the second storage means and updates, in the updating process, all the pieces of specific information stored in the third storage means with the specific information extracted from the first storage means.

In still another preferred embodiment, the electronic control apparatus further includes one or more third storage means in each of which a piece of specific information on the engine control software is stored. The processor determines, in the determining process, whether the piece of specific information extracted from the first storage means is incoincident with each of the pieces of specific information stored in all the third storage means. When the piece of specific information extracted is determined as being incoincident with each of the pieces of specific information stored, the processor initializes, in the initializing process, the retention data stored in the second storage means and updates, in the updating process, all the pieces of specific information stored in the third storage means with the specific information extracted from the first storage means.

In still yet another preferred embodiment, the electronic control apparatus further includes a diagnosis means for diagnosing whether the third storage means is in a normal or an abnormal condition. When the third storage means is diagnosed as being in an abnormal condition, the processor invalidates a result of the process of determining whether or not the piece of specific information extracted from the first storage means is coincident with that stored in the third storage means.

According to another aspect of the present invention, there is provided an electronic control apparatus which includes: a first storage means which is electrically rewritable and nonvolatile and in which engine control software for controlling an engine of a motor vehicle is stored; a second storage means whose contents are retainable when power to the electronic control apparatus is removed; and a processor. The processor performs processes of: executing the engine control software stored in the first storage means to control the engine; storing in the second storage means retention data that is generated through execution of the engine control software and to be retained even when power to the electronic control apparatus is removed; and rewriting the engine control software stored in the first storage means with engine control software sent from an external upon receipt of a rewrite request from the external.

Moreover, the engine control software includes a plurality of functional blocks each of which is for performing a specific function. The retention data includes a plurality of retention data blocks each of which is associated with one of the functional blocks of the engine control software. The electronic control apparatus further includes a plurality of third storage means whose contents are retainable when power to the electronic control apparatus is removed and in each of which a piece of specific information on a corresponding one of the functional blocks of the engine control software is stored. When the electronic control apparatus is activated, the processor further performs, for each of the functional blocks of the engine control software, an initialization control process which includes processes of: extracting a piece of specific information on the functional block of the engine control software from the first storage means; determining whether or not the piece of specific information extracted from the first storage means is coincident with that stored in the corresponding one of the third storage means; initializing the associated one of the retention data blocks in the second storage means when the piece of specific information extracted from the first storage means is determined as being incoincident with that stored in the corresponding one of the third storage means; and updating the piece of specific information stored in the corresponding one of the third storage means with that extracted from the first storage means upon completion of the initializing process.

Furthermore, the processor starts performing the process of executing the engine control software stored in the first storage means before completion of all the initialization control processes for the functional blocks of the engine control software.

With the above configuration, it is possible for the electronic control apparatus to on-board rewrite the engine control software in the first storage means, initialize each of the retention data blocks in the second storage means only when necessary, and ensure excellent startability of the engine.

In one preferred embodiment, when the electronic control apparatus is activated, the processor starts performing the process of executing the engine control software in parallel with the initialization control process for each of the functional blocks of the engine control software.

In another preferred embodiment, when the electronic control apparatus is activated, the processor: first performs the initialization control process for one of the functional blocks of the engine control software which is associated with one of the retention data blocks which includes data necessary for controlling start of the engine; and then starts performing the process of executing the engine control software in parallel with the initialization control process for each of the remaining functional blocks of the engine control software.

For each of the functional blocks of the engine control software, the piece of specific information on the functional block may be version information indicating a version of the functional block. In this case, in the rewriting process, the processor also rewrites in the first storage means, for each of the functional blocks of the engine control software stored in the first storage means, the version information on the functional block with version information indicating a version of a corresponding functional block of the engine control software sent from the external; in the initialization control process for each of the functional blocks of the engine control software, the processor extracts from the first storage means the version information on the functional block as the piece of specific information.

Otherwise, for each of the functional blocks of the engine control software, the piece of specific information on the functional block may be a specific value to the functional block. In this case, in the initialization control process for each of the functional blocks of the engine control software, the processor determines the specific value to the functional block by performing a predetermined computation on the functional block, and retrieves the determined specific value as the piece of specific information.

In yet another preferred embodiment, the electronic control apparatus further includes, for each of the functional blocks of the engine control software, one or more third storage means in each of which a piece of specific information on the functional block is stored. In the initialization control process for each of the functional blocks of the engine control software, the processor determines whether the piece of specific information on the functional block extracted from the first, storage means is incoincident with at least one of the pieces of specific information stored in all the third storage means for the functional block. When the piece of specific information extracted is determined as being incoincident with at least one of the pieces of specific information stored, the processor initializes the associated one of the retention data blocks in the second storage means and updates all the pieces of specific information stored in the third storage means for the functional block with the piece of specific information on the functional block extracted from the first storage means.

In still another preferred embodiment, the electronic control apparatus further includes, for each of the functional blocks of the engine control software, one or more third storage means in each of which a piece of specific information on the functional block is stored. In the initialization control process for each of the functional blocks of the engine control software, the processor determines whether the piece of specific information on the functional block extracted from the first storage means is incoincident with each of the pieces of specific information stored in all the third storage means for the functional block. When the piece of specific information extracted is determined as being incoincident with each of the pieces of specific information stored, the processor initializes the associated one of the retention data blocks in the second storage means and updates all the pieces of specific information stored in the third storage means for the functional block with the piece of specific information on the functional block extracted from the first storage means.

In still yet another preferred embodiment, the electronic control apparatus further includes a diagnosis means for diagnosing whether each of the third storage means is in a normal or an abnormal condition. When one of the third storage means is diagnosed as being in an abnormal condition, the processor invalidates a result of the process of determining whether or not the piece of specific information on the corresponding one of the functional blocks of the engine control software extracted from the first storage means is coincident with that stored in the one of the third storage means.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings:

FIG. 4 is a schematic diagram illustrating effects of the processes of the CPU illustrated in FIGS. 2, 3A, and 3B;

DESCRIPTION OF PREFERRED EMBODIMENTS

Figure 1:
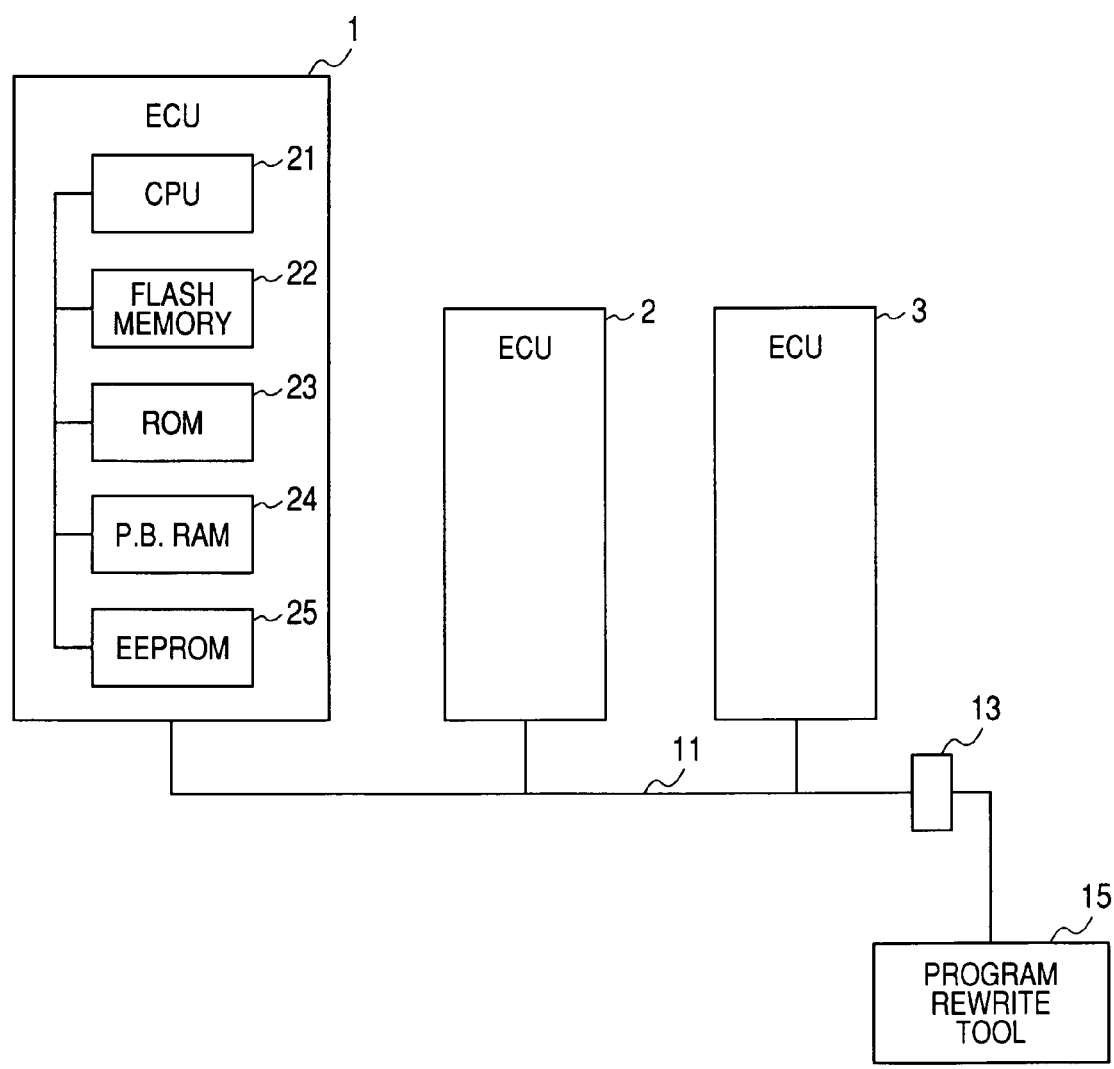
FIG. 1 is a functional block diagram showing the overall configuration of an electronic control unit according to the first embodiment of the invention.

Preferred embodiments of the present invention and their variations will be described hereinafter with reference to FIGS. 1-15.

It should be noted that, for the sake of clarity and understanding, identical components having identical functions in different embodiments of the invention have been marked, where possible, with the same reference numerals in each of the figures.

First Embodiment

FIG. 1 shows the overall configuration of an Electronic Control Unit (ECU) 1 according to the first embodiment of the invention. The ECU 1 is for controlling an engine of a motor vehicle.

As shown in FIG. 1, the ECU 1 is connected with other ECUs 2 and 3 via a communication line 11, so that it can share various information with the ECUs 2 and 3 and utilizes the information to control the engine. For example, the ECU 2 is for controlling transmission of the vehicle, and the ECU 3 is for controlling devices belonging to the body system of the vehicle, such as a power window and a door lock.

The ECU 1 includes a CPU 21, which governs operation of the ECU 1 and executes engine control software for controlling the engine, a flash memory 22 in which the engine control software is stored, a non-rewritable ROM 23, a power-backed up RAM 24 (abbreviated to P.B. RAM in FIG. 1) which is backed up in power and thus always supplied with power, and an EEPROM 25.

The flash memory 22 is electrically rewritable and nonvolatile. In the flash memory 22, there is stored the engine control software along with version information indicating the version of the engine control software. In addition, the engine control software consists of programs and data for controlling the engine.

The ROM 23 stores therein other software than the engine control software, for example software for rewriting the contents of the flash memory 22.

The EEPROM 25 is also electrically rewritable and nonvolatile. The EEPROM 25 includes a retention data storage area and a specific information storage area. In the retention data storage area, there is stored retention data that is a part of data generated through execution of the engine control software and has to be retained even when power supply to the ECU 1 is stopped. The retention data includes, for example, learning values and diagnostic information. The learning values are referred to in the execution of the engine control software by the CPU 21 and thus used in control of the engine. In the specific information storage area, there is stored, as a piece of specific information on the engine control software through execution of which the retention data currently stored in the retention data storage area has been generated, version information indicating the version of that engine control software.

The ECU 1 is powered and thus activated upon turning on an ignition switch of the vehicle. In addition, though not shown in FIG. 1, the ECU 1 also includes a general RAM which is not backed up in power.

To the communication line 11, there is further connected a program rewrite tool 15 via a connector 13. Upon receipt of a rewrite request from the tool 15, the ECU 1 rewrites the engine control software stored in the flash memory 22 with engine control software sent from the tool 15.

Figure 2:
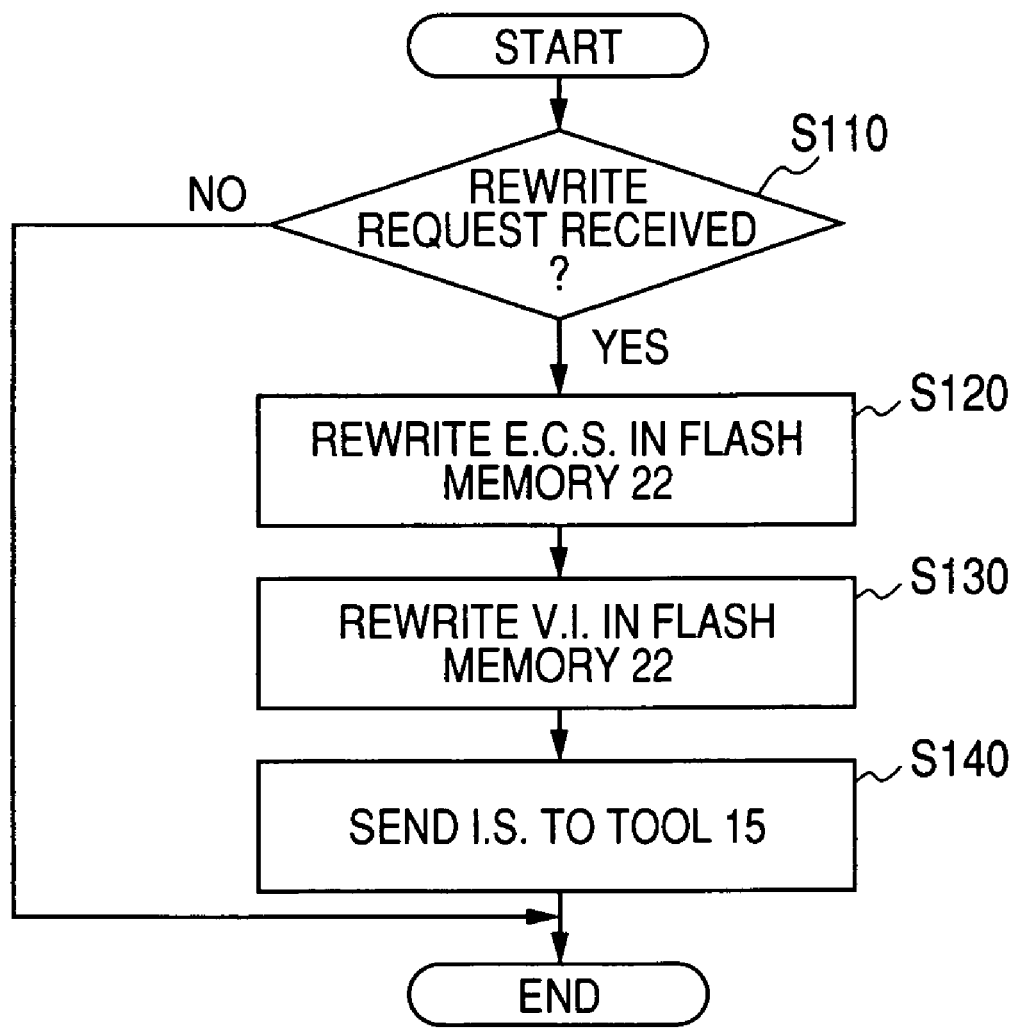
FIG. 2 is a flow chart illustrating a process of a CPU of the electronic control unit for rewriting engine control software in a flash memory of the electronic control unit.

FIG. 2 illustrates a process of the CPU 21 for controlling rewrite of the engine control software in the flash memory 22. In the present embodiment, software for accomplishing this rewrite control process is stored in the ROM 23. However, it is also possible to download the software from the program rewrite tool 15 and execute it on the general RAM.

First, at step S110, the CPU 21 determines, by performing not-shown communication program, whether a rewrite request from the program rewrite tool 15 has been received.

If the determination at Step 110 produces a "NO" answer, then the process directly goes to the end. On the contrary, if the determination at Step 110 produces a "YES" answer, then the process proceeds to Step 120.

At step S120, the CPU 21 performs a rewrite process for the engine control software (abbreviated to E.C.S.) in the flash memory 22. More specifically, the CPU 21 receives new engine control software sent from the program rewrite tool 15, and overwrites the engine control software stored in the flash memory 22 with the new one.

At step S130, the CPU 21 performs a rewrite process for the version information (abbreviated to V.I. in FIG. 2) on the engine control software in the flash memory 22. More specifically, the CPU 21 receives the version information on the new engine control software, which is sent from the program rewrite tool 15 along with the new engine control software, and overwrites the version information on the engine control software stored in the flash memory 22 with the version information on the new engine control software.

At step S140, the CPU 21 sends an informing signal (abbreviated to I.S. in FIG. 2) to the program rewrite tool 15, thereby informing the tool 15 of completion of the rewrite of the engine control software and version information. Then, the process goes to the end.

In addition, upon receipt of the informing signal, the program rewrite tool 15 indicates, on a display portion thereof, that the rewrite of the engine control software has been completed.

Figure 3A:
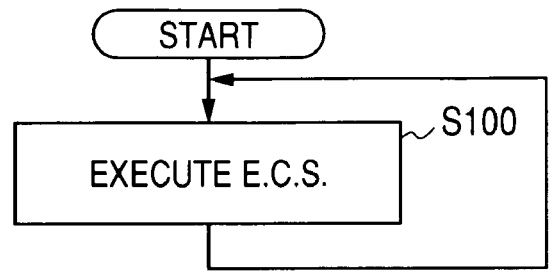
FIG. 3A is a flow chart illustrating a process of the CPU for executing the engine control software.
Figure 3B:
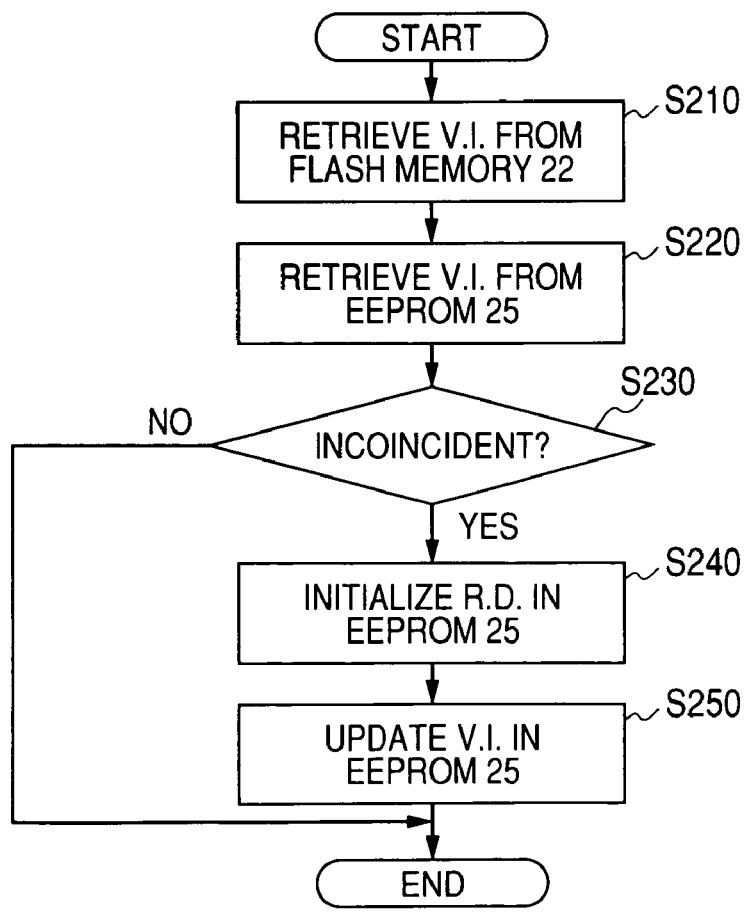
FIG. 3B is a flow chart illustrating an initialization control process of the CPU which is performed in parallel with the process of FIG. 3A.

FIGS. 3A and 3B respectively illustrate two processes that are performed by the CPU 21 in parallel with each other when the ECU 1 is activated.

The first one shown in FIG. 3A is a process for executing the engine control software currently stored in the flash memory 22. More specifically, when the ECU 1 is activated upon turning on the ignition switch, the CPU 21 starts executing the engine control software (abbreviated to E.C.S. in FIG. 3A) stored in the flash memory 22, as indicated at step S100. Then, the CPU 21 continues executing the engine control software until the ECU 1 is stopped upon turning off the ignition switch.

The second one shown in FIG. 3B is an initialization control process of the CPU 21. In the present embodiment, software for accomplishing this initialization control process is stored in the ROM 23. However, it is also possible to store the software in the flash memory 22 as a part of the engine control software.

First, at step S210, the CPU 21 retrieves, from the flash memory 22, the version information (abbreviated to V.I. in FIG. 3B) on the engine control software which is currently stored in the flash memory 22.

At step S220, the CPU 21 further retrieves, from the specific information storage area of the EEPROM 25, the version information on the engine control software through execution of which the retention data currently stored in the retention data storage area of the EEPROM 25 has been generated.

At step S230, the CPU 21 determines whether the version information retrieved from the flash memory 22 is incoincident with that retrieved from the EEPROM 25.

If the determination at step S230 produces a "NO" answer, i.e., if the version information retrieved from the flash memory 22 is coincident with that retrieved from the EEPROM 25, then the process directly goes to the end without initializing the retention data. As a result, the CPU 21 comes to perform only the process of executing the engine control software currently stored in the flash memory 22.

On the contrary, if the determination at step S230 produces a "YES" answer, i.e., if the version information retrieved from the flash memory 22 is incoincident with that retrieved from the EEPROM 25, the process proceeds to step S240.

At step S240, the CPU 21 initializes the retention data (abbreviated to R.D. in FIG. 3B) in the retention data storage area of the EEPROM 25. In the present embodiment, the CPU 21 sends to the retention data storage area of the EEPROM 25 default values of the retention data which have been stored in the flash memory 22 as a part of the engine control software, and rewrites the retention data stored in the retention data storage area with the default values. In addition, it is also possible to simply set some of the default values to zero.

At step S250, the CPU 21 updates the version information stored in the specific information storage area of the EEPROM 25 with the version information retrieved from the flash memory 22. In other words, the CPU 21 updates the version information stored in the specific information storage area with the version information on the engine control software that is currently stored in the flash memory 22. Then, the process goes to the end.

FIG. 4 illustrates effects of the processes of the CPU 21 described above with reference to FIGS. 2, 3A, and 3B.

First, before an execution of the rewrite processes for the engine control software and version information as indicated at steps S120 and S130 of FIG. 2, there are stored in the flash memory 22 both old engine control software (abbreviated to E.C.S. in FIG. 4) and old version information (abbreviated to V.I. in FIG. 4). Here, the old engine control software denotes the engine control software which has been stored in the flash memory 22 when the execution of the rewriting processes starts; the old version information denotes the version information on the old engine control software. On the other hand, in the EEPROM 25, there is stored the same old version information as in the flash memory 22.

Secondly, after the execution of the rewrite processes, the old engine control software and old version information have been respectively overwritten with new engine control software and new version information. Here, the new engine control software denotes the engine control software which has been newly sent from the program rewrite tool 15 and overwritten on the old engine control software in the flash memory 22 in the execution of the rewriting process; the new version information denotes the version information on the new engine control software. On the other hand, in the EEPROM 25, there is still stored the old version information.

In addition, if the new engine control software is different from the old engine control software, then the new version information is also different from the old version information. On the contrary, if the new engine control software is identical to the old engine control software, then the new version information is also identical to the old version information.

Thirdly, in the first activation of the ECU 1 after the execution of the rewrite processes, the old version information stored in the EEPROM 25 is updated with the new version information when they are different from each other.

More specifically, in this case, the new version information is first determined as being incoincident with the old version information at step S230 of FIG. 3B. Then, the retention data stored in the retention data storage area of the EEPROM 25 is initialized at step S240 of FIG. 3B. Thereafter, the old version information stored in the EEPROM 25 is overwritten with the new version information at step S250 of FIG. 3B.

Fourthly, in the second and subsequent activations of the ECU 1 after the execution of the rewrite processes, there is stored in the EEPROM 25 the same new version information as in the flash memory 22.

Therefore, the determination at the step S230 of FIG. 3B produces a "NO" answer; thus the retention data stored in retention data storage area of the EEPROM 25 is not initialized, and the version information stored in the specific information storage area of the EEPROM 25 is not updated.

On the other hand, when the new engine control software is identical to the old engine control software, the new version information which is stored in the flash memory 22 through the execution of the rewrite processes is also identical to the old version information stored in the EEPROM 25.

Therefore, though not illustrated in FIG. 4, in the first and subsequent activations after the execution of the rewrite processes, the determination at step S230 of FIG. 3B produces a "NO" answer; thus, the retention data stored in the retention data storage area of the EEPROM 25 is not initialized, and the version information stored in the specific information storage area of the EEPROM 25 is not updated.

In addition, when the ECU 1 is first activated after the engine control software has been initially written in the flash memory 22, there is no version information stored in the EEPROM 25. In this case, the determination at step S230 of FIG. 3B produces a "YES" answer. Then, the retention data is initialized in the retention data storage area of the EEPROM 25 at step S240, and the version information stored in the flash memory 22 is first written in the specific information storage area of the EEPROM 25 at step S250. After that, in the second and subsequent activations after the initial write of the engine control software, the CPU 21 performs the same processes as at the fourth step of FIG. 4.

The above-described ECU 1 according to the present embodiment has the following advantages.

In the present embodiment, the retention data is not initialized in the second and subsequent activations after each execution of the rewriting processes for the engine control software and version information. Further, the retention data is also not initialized in the first activation after each of those executions of the rewriting processes where the new engine control software is identical to the old engine control software. That is to say, in the ECU 1, the retention data is initialized only in the first activation after each of those executions of the rewriting processes where the new engine control software is different from the old engine control software. Therefore, in the ECU 1, any unnecessary initialization of the retention data is avoided.

In the present embodiment, the CPU 21 starts performing the process of executing the engine control software stored in the flash memory 22 before completion of the initialization control process. More specifically, in the present embodiment, the CPU 21 starts performing the process of executing the engine control software in parallel with the initialization control process when the ECU 1 is activated. The initialization control process includes the processes of extracting (or retrieving) the version information from the flash memory 22, determining whether the version information extracted from the flash memory 22 is incoincident with that stored in the specific information storage area of the EEPROM 25, initializing the retention data stored in the retention data storage area of the EEPROM 25 when the version information extracted is incoincident with the version information stored, and updating the version information stored in the specific information storage area of the EEPROM 25 with the version information extracted from the flash memory 22. Therefore, any delay in starting the engine is avoided.

Accordingly, the ECU 1 according to the present embodiment can on-board rewrite in the flash memory 22 the engine control software, initialize the retention data in the EEPROM 25 only when necessary, and ensure excellent startability of the engine.

In addition, in the present embodiment, the flash memory 22 makes up a first storage means for storing the engine control software, the retention data storage area of the EEPROM 25 makes up a second storage means for storing the retention data, and the specific information storage area of the EEPROM 25 makes up a third storage means for storing the version information on the engine control software.

Second Embodiment

This embodiment illustrates an ECU 1A which is identical in hardware to the ECU 1 according to the previous embodiment. Accordingly, only the differences in software therebetween will be described hereinafter.

In the ECU 1A, the CPU 21 performs the rewrite control process illustrated in FIG. 2 with step S130 being deleted. Consequently, there is no version information sent from the program rewrite tool 15 to the ECU 1A.

Figure 5:
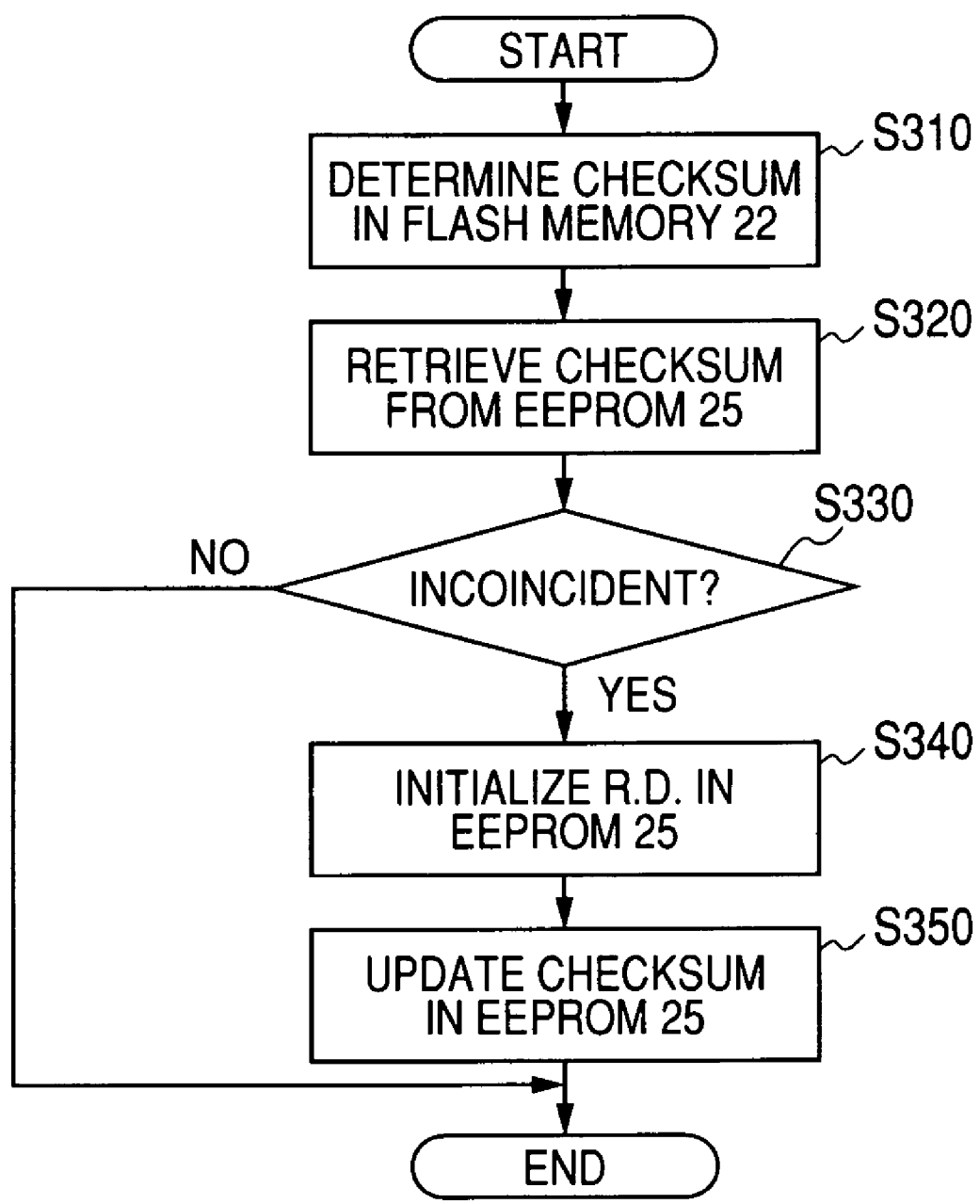
FIG. 5 is a flow chart illustrating an initialization control process of a CPU of an electronic control unit according to the second embodiment of the invention.

Further, in the ECU 1A, the CPU 21 performs, instead of the initialization control process illustrated in FIG. 3B, an initialization control process illustrated in FIG. 5.

First, at step S310 of FIG. 5, the CPU 21 retrieves from the flash memory 22 data that is included in a specific area of the engine control software, and determines a specific value to the engine control software by performing a predetermined computation on the retrieved data. More specifically, in the present embodiment, the CPU 21 determines the checksum on the retrieved data. The determined checksum is specific to the engine control software stored in the flash memory 22 and thus used as the piece of specific information on the engine control software. Further, as the specific area for the checksum determination, it is preferable to use the entire engine control software. However, it is also possible to use a predetermined part taken from the beginning or end of the engine control software as the specific area for the checksum determination.

At step S320, the CPU 21 retrieves the checksum which has been previously determined and stored in the specific information storage area of the EEPROM 25.

At step S330, the CPU 21 determines whether the checksum determined at step S310 is incoincident with that retrieved from the EEPROM 25 at step S320.

If the determination at step S330 produces a "NO" answer, i.e., if the checksum determined at step S310 is coincident with that retrieved from the EEPROM 25, then the process directly goes to the end without initializing the retention data.

On the contrary, if the determination at step S330 produces a "YES" answer, i.e., if the checksum determined at step S310 is incoincident with that retrieved from the EEPROM 25, the process proceeds to step S340.

At step S340, the CPU 21 initializes the retention data (abbreviated to R.D. in FIG. 5) in the retention data storage area of the EEPROM 25 in the same manner as at step S240 of FIG. 3B.

At step S350, the CPU 21 updates the checksum in the specific information storage area of the EEPROM 25 with the checksum determined at step S310. In other words, the CPU 21 overwrites the checksum determined at step S310 on the checksum stored in the specific information storage area of the EEPROM 25. Then, the process goes to the end.

As above, in the present embodiment, the specific value to the engine control software, which is determined by performing a predetermined computation on data included in a specific area of the engine control software, is used as the piece of specific information on the engine control software, instead of the version information used in the previous embodiment.

Accordingly, before an execution of the rewrite process for the engine control software as indicated at steps S120 of FIG. 2, there is stored in the flash memory 22 old engine control software, no old specific value. Here, the old engine control software denotes the engine control software which has been stored in the flash memory 22 when the execution of the rewriting process starts; the old specific value denotes the specific value to the old engine control software. On the other hand, in the EEPROM 25, there is stored the old specific value.

After the execution of the rewrite process, the old engine control software has been overwritten with new engine control software. Here, the new engine control software denotes the engine control software which has been newly sent from the program rewrite tool 15 and overwritten on the old engine control software in the flash memory 22 in the execution of the rewriting process. On the other hand, in the EEPROM 25, there is still stored the old specific value.

In the first activation of the ECU 1A after the execution of the rewrite process, the old specific value stored in the EEPROM 25 is updated with a new specific value when they are different from each other. Here, the new specific value denotes the specific value to the new engine control software.

More specifically, in this case, the new specific value is first determined at step S310 of FIG. 5. Then, the new specific value is further determined as being incoincident with the old specific value stored in the EEPROM 25 at step S330 of FIG. 5. Thus, the retention data stored in the retention data storage area of the EEPROM 25 is initialized at step S340 of FIG. 5. Thereafter, the old specific value stored in the EEPROM 25 is overwritten with the new specific value determined at step S350 of FIG. 5.

In the second and subsequent activations of the ECU 1A after the execution of the rewrite process, since there is stored in the EEPROM 25 the new specific value, the determination at the step S330 of FIG. 5 produces a "NO" answer; thus the retention data stored in retention data storage area of the EEPROM 25 is not initialized, and the specific value stored in the specific information storage area of the EEPROM 25 is not updated.

On the other hand, when the new engine control software is identical to the old engine control software, the new specific value determined at step S310 of FIG. 5 is also identical to the old specific value stored in the EEPROM 25.

Therefore, in the first and subsequent activations after the execution of the rewrite process, the determination at step S330 of FIG. 5 produces a "NO" answer; thus, the retention data stored in the retention data storage area of the EEPROM 25 is not initialized, and the specific value stored in the specific information storage area of the EEPROM 25 is not updated.

The above-described ECU 1A has the same advantages as the ECU 1 described in the previous embodiment.

Moreover, in the ECU 1A, when the new engine control software has the same version information as, but different contents from the old engine control software, the retention data stored in EEPROM 25 is still initialized in the first activation from the execution of the rewrite process. Therefore, it is possible for the ECU 1A to more reliably initialize the retention data.

Third Embodiment

This embodiment illustrates an ECU 1B which has almost the same configuration as the ECU 1 according to the first embodiment. Accordingly, only the differences therebetween will be described hereinafter.

In the ECU 1B, the EEPROM 25 includes N (i.e., a plurality of) specific information storage areas. For the sake of simplifying explanation, it is assumed hereinafter that N=2.

Figure 6:
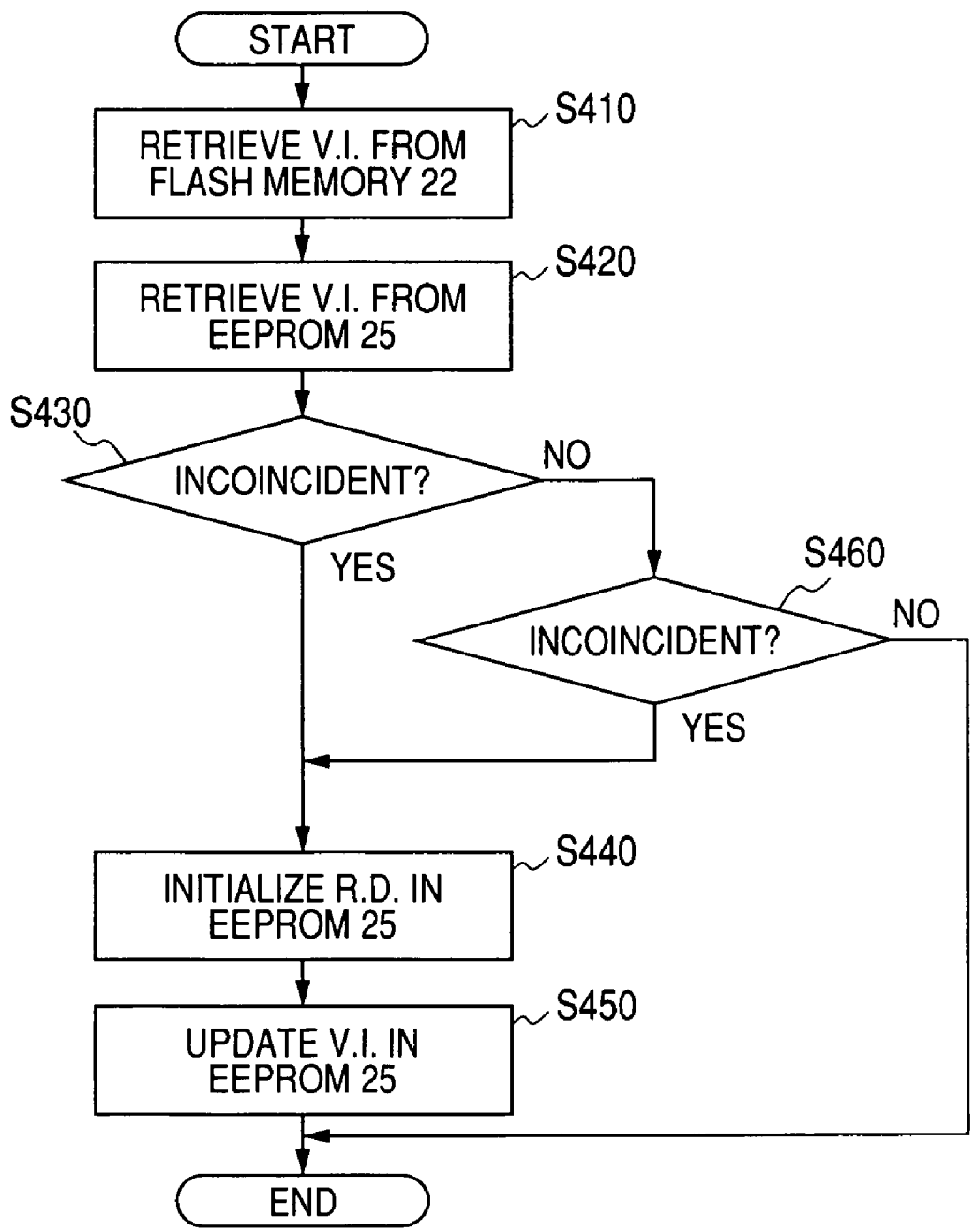
FIG. 6 is a flow chart illustrating an initialization control process of a CPU of an electronic control unit according to the third embodiment of the invention.

Further, in the ECU 1B, the CPU 21 performs, instead of the initialization control process illustrated in FIG. 3B, an initialization control process illustrated in FIG. 6.

First, at step S410 of FIG. 6, the CPU 21 retrieves, from the flash memory 22, the version information (abbreviated to V.I. in FIG. 6) on the engine control software which is currently stored in the flash memory 22.

At step S420, the CPU 21 further retrieves, from each of the two specific information storage areas of the EEPROM 25, the version information on the engine control software through execution of which the retention data currently stored in the retention data storage area of the EEPROM 25 has been generated.

At step S430, the CPU 21 determines whether the version information retrieved from the flash memory 22 is incoincident with that retrieved from one of the two specific information storage areas of the EEPROM 25.

If the determination at step S430 produces a "NO" answer, then the process proceeds to step S460. On the contrary, if the determination at step S430 produces a "YES" answer, then the process goes on to step S440.

At step S460, the CPU 21 further determines whether the version information retrieved from the flash memory 22 is incoincident with that retrieved from the other specific information storage area of the EEPROM 25 at step S420.

If the determination at step S460 produces a "NO" answer, then the process directly goes to the end without initializing the retention data. On the contrary, if the determination at step S460 produces a "YES" answer, then the process proceeds to step S440.

At step S440, the CPU 21 initializes the retention data (abbreviated to R.D. in FIG. 6) in the retention data storage area of the EEPROM 25 in the same manner as at step S240 of FIG. 3B.

At step S450, the CPU 21 updates the version information in each of the specific information storage areas of the EEPROM 25 with the version information retrieved from the flash memory 22 in the same manner as at step S250 of FIG. 3B. In other words, the CPU 21 updates all the version information stored in the EEPROM 25 with the version information on the engine control software that is currently stored in the flash memory 22. Then, the process goes to the end.

As above, in the present embodiment, there are provided in the EEPROM 25 the plurality of specific information storage areas, in each of which is stored the piece of specific information (i.e., the version information). The CPU 21 determines whether the piece of specific information retrieved from the flash memory 22 is incoincident with at least one of the pieces of specific information stored in all the specific information storage areas of the EEPROM 25; if it is, the CPU 21 initializes the retention data in the retention data storage area of the EEPROM 25 and updates all the pieces of specific information stored in the specific information storage areas with the piece of specific information retrieved from the flash memory 22.

With such a configuration, it is possible for the ECU 1B to reliably initialize the retention data even when either of the pieces of specific information stored in the specific information storage areas of the EEPROM 25 turns into garbage.

In addition, it is also possible to combine the configuration of the ECU 1B with that of the ECU 1A described in the second embodiment. More specifically, in this case, the initialization control process of FIG. 6 can be modified such that: at step S410, the CPU 21 determines the specific value to the engine control software stored in the flash memory 22 by performing a predetermined computation on data that is included a specific area of the engine control software; at step S420, the CPU 21 retrieves, from each of the two specific information storage areas of the EEPROM 25, the specific value which has been previously determined and stored therein; at steps S430 and S460, the CPU determines whether the specific value determined at step S410 is incoincident with at least one of the specific values stored in the specific information storage areas of the EEPROM 25; if it is, the CPU 21 initialize the retention data in the retention data storage are of the EEPROM 25 at step S440, and updates all the specific values stored in the specific information storage areas of the EEPROM 25 with the specific value determined at step S410.

Fourth Embodiment

This embodiment illustrates an ECU 1C which has almost the same configuration as the ECU 1B according to the third embodiment. Accordingly, only the differences therebetween will be described hereinafter.

Figure 7:
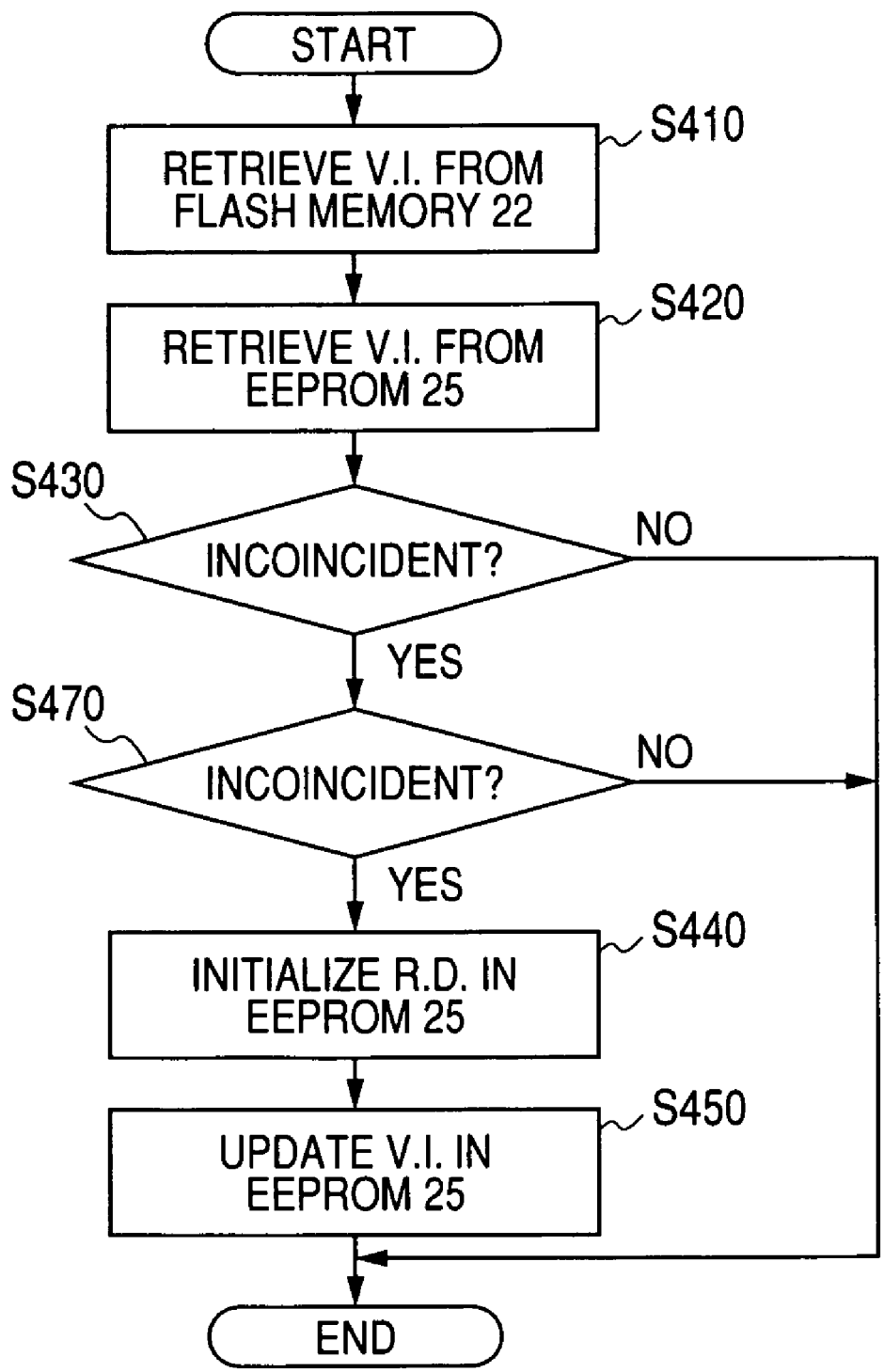
FIG. 7 is a flow chart illustrating an initialization control process of a CPU of an electronic control unit according to the fourth embodiment of the invention.

In the ECU 1C, the CPU 21 performs, instead of the initialization control process illustrated in FIG. 6, an initialization control process illustrated in FIG. 7.

The process of FIG. 7 includes the same steps S410, S420, S440, and S450 as the process of FIG. 6; therefore, for the sake of avoiding redundancy, description of those steps is not repeated hereinafter.

At step S430 of FIG. 7, the CPU 21 determines whether the version information retrieved from the flash memory 22 is incoincident with that retrieved from one of the two specific information storage areas of the EEPROM 25.

If the determination at step S430 produces a "NO" answer, then the process directly goes to the end without initializing the retention data. On the contrary, if the determination at step S430 produces a "YES" answer, then the process proceeds to step S470.

At step S470, the CPU 21 further determines whether the version information retrieved from the flash memory 22 is incoincident with that retrieved from the other specific information storage area of the EEPROM 25.

If the determination at step S470 produces a "NO" answer, then the process directly goes to the end without initializing the retention data. On the contrary, if the determination at step S470 produces a "YES" answer, then the process proceeds to step S440.

As above, in the present embodiment, there are provided in the EEPROM 25 the plurality of specific information storage areas, in each of which is stored the piece of specific information (i.e., the version information). The CPU 21 determines whether the piece of specific information retrieved from the flash memory 22 is incoincident with each of the pieces of specific information stored in the specific information storage areas of the EEPROM 25; if it is, the CPU 21 initializes the retention data in the retention data storage area of the EEPROM 25 and updates all the pieces of specific information stored in the specific information storage areas with the piece of specific information retrieved from the flash memory 22.

With such a configuration, it is possible for the ECU 1C to reliably prevent unnecessary initialization of the retention data even when either of the pieces of specific information stored in the specific information storage areas of the EEPROM 25 turns into garbage.

In addition, it is also possible to combine the configuration of the ECU 1C with that of the ECU 1A according to the second embodiment, in the same manner as to combine the configurations of the ECU 1B and ECU 1A as described in the third embodiment.

Fifth Embodiment

This embodiment illustrates an ECU 1D which is identical in hardware to the ECU 1 according to the first embodiment. Accordingly, only the differences in software therebetween will be described hereinafter.

In the ECU 1D, in initializing the retention data stored in the EEPROM 25, the CPU 21 first initializes engine start control data that is a part of the retention data and necessary for controlling start of the engine.

More specifically, the engine start control data includes learning values necessary for controlling start of the engine. The learning values include, for example, a learning value of injection quantity which is necessary for correcting a fuel injection quantity in starting the engine, a learning value of energizing current which is necessary for determining current for energizing a motor-driven pump that feeds fuel to a fuel injector.

Further, when the ECU 1D is activated upon turning on the ignition switch, the CPU 21 does not immediately start executing the engine control software stored in the flash memory 22.

Figure 8:
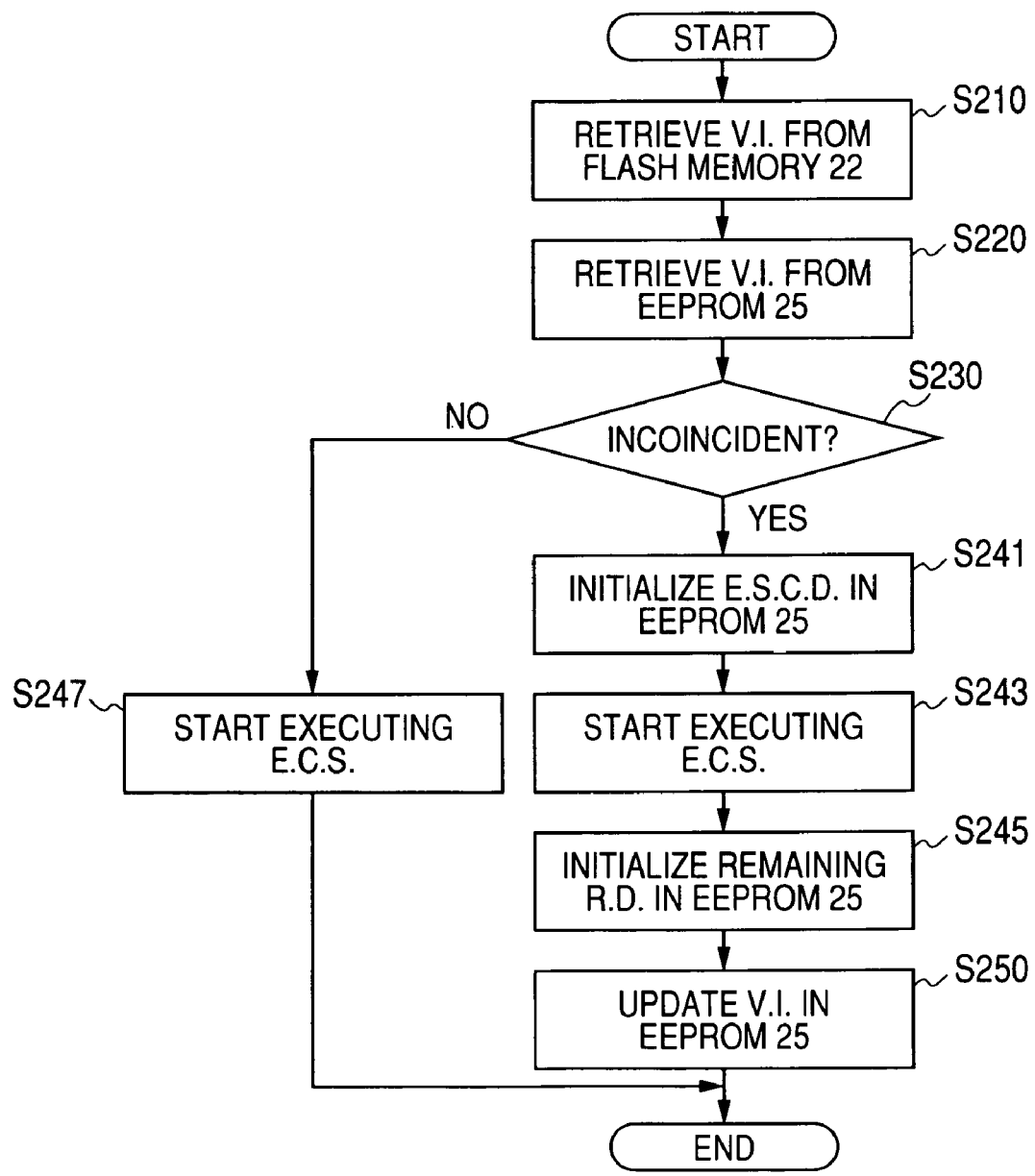
FIG. 8 is a flow chart illustrating an initialization control process of a CPU of an electronic control unit according to the fifth embodiment of the invention.

More specifically, in the ECU 1D, the CPU 21 performs, instead of the initialization control process illustrated in FIG. 3B, an initialization control process illustrated in FIG. 8.

The process of FIG. 8 includes the same steps S210 and S220 as the process of FIG. 3B; therefore, for the sake of avoiding redundancy, description of those steps is not repeated hereinafter.

At step 230 of FIG. 8, the CPU 21 determines whether the version information retrieved from the flash memory 22 is incoincident with that retrieved from the specific information storage area of the EEPROM 25.

If the determination at step S230 produces a "NO" answer, then the process proceeds to step S247.

At step S247, the CPU 21 starts executing the engine control software stored in the flash memory 22. Then, the process directly goes to the end. As a result, the CPU 21 comes to perform only the process of executing the engine control software.

On the contrary, if the determination at step S230 produces a "YES" answer, the process goes on to step S241.

At step S241, the CPU 21 initializes the engine start control data (Abbreviated to E.S.C.D. in FIG. 8).

At step S243, the CPU 21 starts, after completion of the initialization of the engine start control data, executing the engine control software stored in the flash memory 22. As a result, the CPU 21 comes to perform the process of executing the engine control software in parallel with the remaining steps of the initialization control process.

At step S245, the CPU initializes the remaining part of the retention data (i.e., the other part of the retention data than the engine start control data).

At step S250, the CPU 21 updates the version information in the specific information storage area of the EEPROM 25 with the version information retrieved from the flash memory 22. Then, the process goes to the end.

The above-described ECU 1D has the same advantages as the ECU 1 described in the first embodiment. In particular, in the ECU 1D, the CPU 21 also starts performing the process of executing the engine control software stored in the flash memory 22 before completion of the initialization control process.

Moreover, in the ECU 1D, in the first activation after an execution of the rewrite processes for the engine control software and version information, the engine control software newly stored in the flash memory 22 is executed only after the engine start control data is initialized to default values that are more suitable to the new engine control software. Therefore, it is possible for the ECU 1D to reliably perform more suitable control of the engine right from the start while ensuring excellent startability of the engine.

In addition, it is also possible to combine the configuration of the ECU 1D with either of the configurations of the ECU 1A, ECU 1B, and ECU 1C described in the second to fourth embodiments.

Sixth Embodiment

This embodiment illustrates an ECU 1E which has almost the same configuration as the ECU 1 according to the first embodiment. Accordingly, only the differences therebetween will be described hereinafter.

Figure 9:
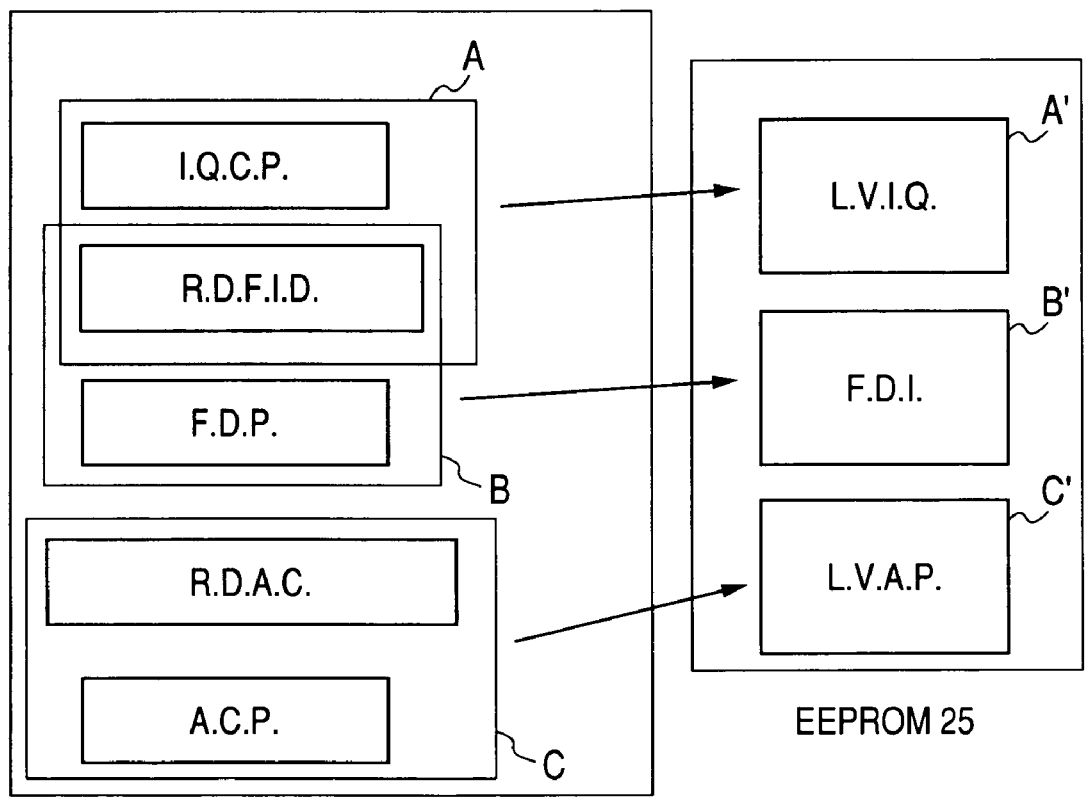
FIG. 9 is a functional block diagram illustrating the relationship between functional blocks of engine control software and retention data blocks in an electronic control unit according to the sixth embodiment of the invention.

Referring to FIG. 9, the engine control software stored in the flash memory 22 includes a plurality of functional blocks each of which performs a specific function. On the other hand, the retention data stored in the EEPROM 25 includes a plurality of retention data blocks each of which is associated with (i.e., updated or used by) one of the functional blocks of the engine control software. When the functional blocks of the engine control software are rewritten in the flash memory 22, it is necessary to initialize the respectively associated retention data blocks in the EEPROM 25.

For example, the functional blocks of the engine control software includes a block A for fuel injection control, a block B for failure diagnosis, and a block C for accelerator control (or throttle control). The block A includes an injection quantity control program (abbreviated to I.Q.C.P. in FIG. 9) for controlling fuel injection quantities and reference data for fuel injection and diagnosis (abbreviated to R.D.F.I. D. in FIG. 9) which is referred to by the injection quantity control program for determining suitable fuel injection quantities. The block B includes a failure diagnosis program (abbreviated to F.D.P. in FIG. 9) and the reference data for fuel injection and diagnosis which is also referred to by the failure diagnosis program for determining failures. The block C includes an accelerator control program (abbreviated to A.C.P. in FIG. 9) and reference data for accelerator control (abbreviated R.D.A.C. in FIG. 9).

It should be noted that the functional blocks of the engine control program may overlap each other. For example, the blocks A and B share the retention data for fuel injection and diagnosis as shown in FIG. 9.

On the other hand, the retention data blocks stored in the EEPROM 25 include blocks A', B', and C' which are respectively associated with the functional blocks A, B, and C of the engine control software stored in the flash memory 22. The block A' includes engine start control data, such as learning values of injection quantities (abbreviated to L.V.I.Q.) for correcting fuel injection quantities. The block B' includes failure diagnosis information (abbreviated to F.D.I. in FIG. 9). The block C' incudes includes learning values of accelerator positions (abbreviated to L.V.A.P.) for correcting accelerator positions (i.e., throttle positions).

In the present embodiment, the program rewrite tool 15 sends to the ECU 1E version information on each of the functional blocks A, B, and C along with the engine control software. Then, the CPU 21 rewrites, at step S130 of the rewrite control process shown in FIG. 2, the version information (abbreviated to V.I. in FIG. 2) on each of the functional blocks A, B, and C in the flash memory 22.

Further, in the ECU 1E, the EEPROM 25 includes a plurality of (i.e., three in the present embodiment) specific information storage areas, in each of which the version information on a corresponding one of the functional blocks of the engine control software is stored.

Figure 10A:
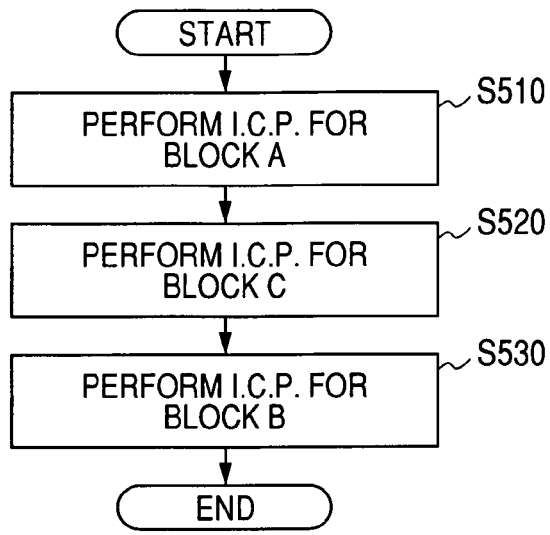
FIG. 10A is a flow chart illustrating an activation process of a CPU of an electronic control apparatus according to the sixth embodiment of the invention.

Furthermore, when the ECU 1E is activated upon turning on the ignition switch, the CPU 21 performs, instead of the initialization control process shown in FIG. 3B, an activation process shown in FIG. 10A in parallel with the process of executing the engine control software as shown in FIG. 3A.

First, at step S510 of FIG. 10A, the CPU 21 performs for the functional block A of the engine control software an initialization control process which is abbreviated to I.C.P. in FIG. 10A and to be described in detail later.

At step S520, the CPU 21 performs the initialization control process for the functional block C of the engine control software.

At step S530, the CPU 21 performs the initialization control process for the functional block B of the engine control software. Then, the process goes to the end.

Figure 10B:
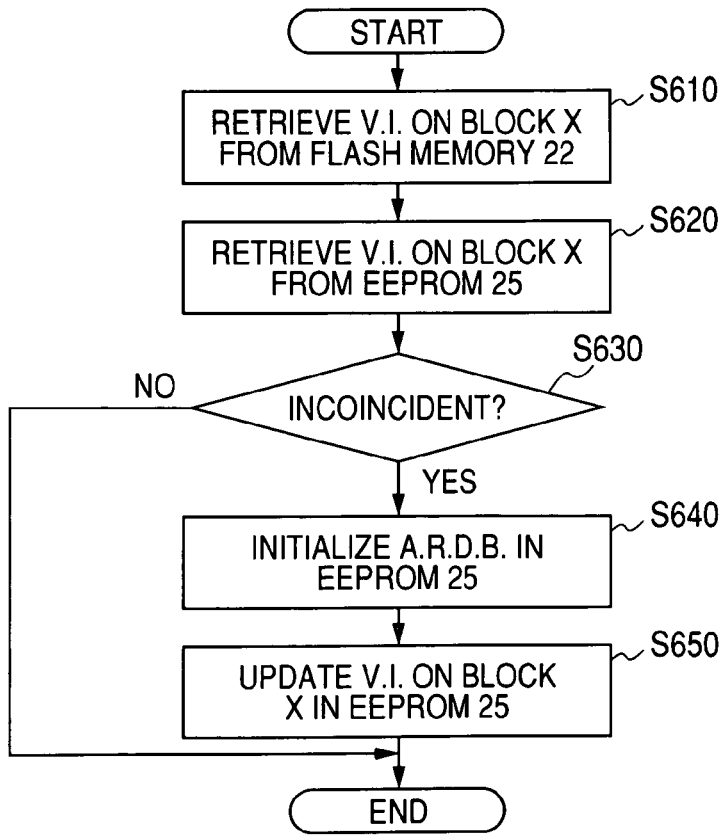
FIG. 10B is a flow chart illustrating an initialization control process of the CPU of the electronic control apparatus according to the sixth embodiment.

FIG. 10B illustrates the initialization control process of the CPU 21, which is performed for each of the functional blocks A-C of the engine control software in the activation process of FIG. 10A.

First, at step S610 of FIG. 10B, the CPU 21 retrieves, from the flash memory 22, the version information (abbreviated to V.I. in FIG. 10B) on a functional block X (X is either A, B, or C) of the engine control software which is currently stored in the flash memory 22.

At step S620, the CPU 21 further retrieves, from the corresponding one of the specific information storage areas of the EEPROM 25, the version information on the functional block X of the engine control software through execution of which the retention data currently stored in the EEPROM 25 has been generated.

At step S630, the CPU 21 determines, for the functional block X, whether the version information retrieved from the flash memory 22 is incoincident with that retrieved from the EEPROM 25.

If the determination at step S630 produces a "NO" answer, i.e., if the version information retrieved from the flash memory 22 is coincident with that retrieved from the EEPROM 25, then the process directly goes to the end.

On the contrary, if the determination at step S630 produces a "YES" answer, i.e., if the version information retrieved from the flash memory 22 is incoincident with that retrieved from the EEPROM 25, the process proceeds to step S640.

At step S640, the CPU 21 initializes that retention data block (abbreviated to A.R.D.B. in FIG. 10B) of the retention data stored in the EEPROM 25 which is associated with the functional block X of the engine software.

At step S650, the CPU 21 updates the version information in the corresponding specific information storage area of the EEPROM 25 with the version information retrieved from the flash memory 22. Then, the process goes to the end.

As above, in the ECU 1E according to the present embodiment, the CPU 21 performs, for each of the functional blocks A-C of the engine control software, the initialization control process which includes the processes of determining whether the functional block is updated and initializing the associated retention data block when it is updated.

Consequently, in the first activation of the ECU 1E after an execution of the rewrite process for the engine control software, the CPU 21 initializes only those retention data blocks in the EEPROM 25 which are associated with the functional blocks of the engine control software which are updated through the execution of the rewrite process.

For example, suppose that only the functional block A is updated among the functional blocks A-C of the engine control software stored in the flash memory 22. Then, for the functional blocks B and C, the version information retrieved from the flash memory 22 is identical to that stored in the corresponding specific information storage area of the EEPROM 25. On the contrary, for the functional block A, the version information retrieved from the flash memory 22 is different from that stored in the corresponding specific information storage area of the EEPROM 25.

In the first activation of the ECU 1E after the execution of the rewrite process, only the determination at step S630 of the initialization control process for the functional block A produces a "YES" answer; thus, among the retention data blocks A'-C' of the retention data, only the retention data block A', which is associated with the functional block A, is initialized in the EEPROM 25. Moreover, only the version information stored in that specific information storage area of the EEPROM 25 which corresponds to the functional block A is updated.

In the second and subsequent activations of the ECU 1E after the execution of the rewrite process, the determination at step S630 of the initialization control process for each of all the functional blocks A-C produces a "YES" answer; thus, none of the retention data blocks A'-C' is initialized in the EEPROM 25, and no version information stored in the specific information storage areas of EEPROM 25 is updated.

To sum up, in the ECU 1E according to the present embodiment, the CPU 21 initializes only the retention data block(s) which needs to be initialized.

Moreover, the CPU 21 starts performing the process of executing the engine control software stored in the flash memory 22 before completion of all the initialization control processes for the functional blocks A-C of the engine control software. More specifically, in the present embodiment, the CPU 21 immediately starts executing the engine control software stored in the flash memory 22 when the ECU 1E is activated. The CPU 21 also performs the activation process shown in FIG. 10A in parallel with the process of executing the engine control software. In other words, the CPU 21 starts, when the ECU 1E is activated, performing the process of executing the engine control software in parallel with the initialization control process for each of the functional blocks A-C of the engine control software. Therefore, any delay in starting the engine is avoided.

Accordingly, the ECU 1E can on-board rewrite in the flesh memory 22 the engine control software, initializes each of the retention data blocks A'-C' of the retention data in the EEPROM 25 only when necessary, and ensure excellent startability of the engine.

Furthermore, in the ECU 1E, the CPU 21 performs the initialization control process first for the functional block A for fuel injection control, secondly for the functional block C for accelerator control, and lastly for the functional block B for failure diagnosis. Accordingly, the retention data blocks A'-C' of the retention data are initialized in the sequence of A', C', and B'. The retention data block A' includes, as described previously, engine start control data such as learning values of injection quantities. Therefore, in the first activation after an execution of the rewrite process for the engine control software, it is possible for the ECU 1E to reliably perform more suitable control of the engine from the earliest possible time using the initialized engine start control data.

In addition, it is possible to combine the configuration of the ECU 1E with that of the ECU 1A described in the second embodiment. More specifically, in this case, the initialization control process of FIG. 10B can be modified such that: at step S610, the CPU 21 determines a specific value (e.g., checksum) to the functional block X stored in the flash memory 22 by performing a predetermined computation on the block X; at step S620, the CPU 21 retrieves, from the specific information storage area of the EEPROM 25 corresponding to the functional block X, a specific value which has been previously determined and stored therein; at step S630, the CPU determines whether the specific value determined at step S610 is incoincident with that retrieved at step S620; if it is, the CPU 21 initializes at step S640 the retention data block associated with the functional block X, and updates at step S650 the specific value stored in the corresponding specific information storage area of the EEPROM 25 with the specific value determined at step S610.

It is also possible to combine the configuration of the ECU 1E with either of the configurations of the ECU 1B and ECU 1C according to the third and fourth embodiments. More specifically, in such cases, the EEPROM 25 includes, for each of the functional blocks A-C of the engine control software, a plurality of specific information storage areas, and the CPU 21 performs, for each of the functional blocks A-C, either of the initialization control processes shown in FIG. 6 (third embodiment) and FIG. 7 (fourth embodiment).

Seventh Embodiment

This embodiment illustrates an ECU 1F which is identical in hardware to the ECU 1E according to the sixth embodiment. Accordingly, only the differences in software therebetween will be described hereinafter.

In the present embodiment, when the ECU 1F is activated upon turning on the ignition switch, the CPU 21 does not immediately start executing the engine control software stored in the flash memory 22.

Figure 11:
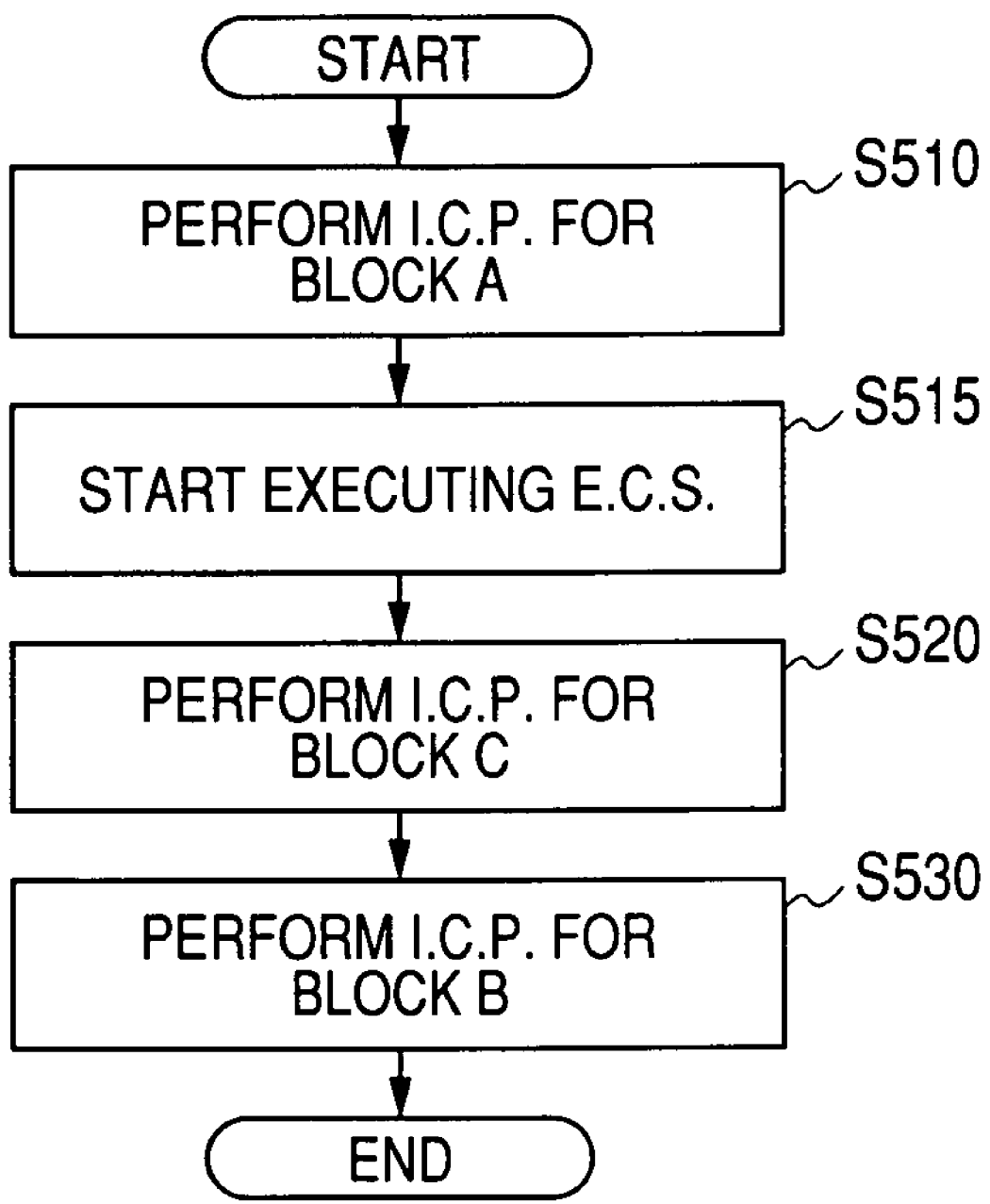
FIG. 11 is a flow chart illustrating an activation process of a CPU of an electronic control apparatus according to the seventh embodiment of the invention.

More specifically, in the ECU 1F, the CPU 21 performs, instead of the activation process illustrated in FIG. 10A, an activation process illustrated in FIG. 11. Compared to the activation process of FIG. 10, the activation process of FIG. 11 additionally includes step S515 between the steps S510 and S520.

First, at step S510 of FIG. 11, the CPU 21 performs only the initialization control process (abbreviated to I.C.P. in FIG. 11) for the functional block A of the engine control software, without simultaneously performing the process of executing the engine control software.

At step S515, after completion of the initialization control process for the functional block A, the CPU 21 starts executing the engine control software (abbreviated to E.C.S. in FIG. 11) stored in the flash memory 22. As a result, the CPU 21 comes to perform the process of executing the engine control software in parallel with the initialization process for each of the remaining functional blocks B and C of the engine control software.

At step S520, the CPU 21 performs the initialization control process for the functional block C of the engine control software.

At step S530, the CPU 21 performs the initialization control process for the functional block B of the engine control software. Then, the process goes to the end.

The above-described ECU 1F has the same advantages as the ECU 1E described in the sixth embodiment. In particular, the CPU 21 starts performing the process of executing the engine control software stored in the flash memory 22 before completion of all the initialization control processes for the functional blocks A-C of the engine control software.

Moreover, in the first activation after an execution of the rewrite process for the engine control software, by which the functional block A is updated, the engine control software newly stored in the flash memory 22 is executed only after the engine start control data is initialized to default values that are more suitable to the new engine control software. As described previously, the engine start control data is included in the retention data block A' associated with the functional block A. Therefore, it is possible for the ECU 1F to reliably perform more suitable control of the engine right from the start while ensuring excellent startability of the engine.

In addition, it is also possible to combine the configuration of the ECU 1F with either of the configurations of the ECU 1A, ECU 1B, and ECU 1C described in the second to fourth embodiments, in the same manner as to combine the ECU 1E with either of those configurations as described in the sixth embodiment.

Variations

The ECUs 1A-1F of the previous embodiments each can be modified to further have a function of determining whether the specific information storage area(s) of the EEPROM 25 is in a normal or abnormal condition. Thus, when the specific information storage area(s) is determined as being in an abnormal condition, the CPU 21 can invalidate the result of a determination based on the version information or specific value retrieved from the specific information storage area. As a result, it is possible to prevent the retention data from being falsely initialized due to a failure of the specific information storage area(s).

Variation 1

Figure 12:
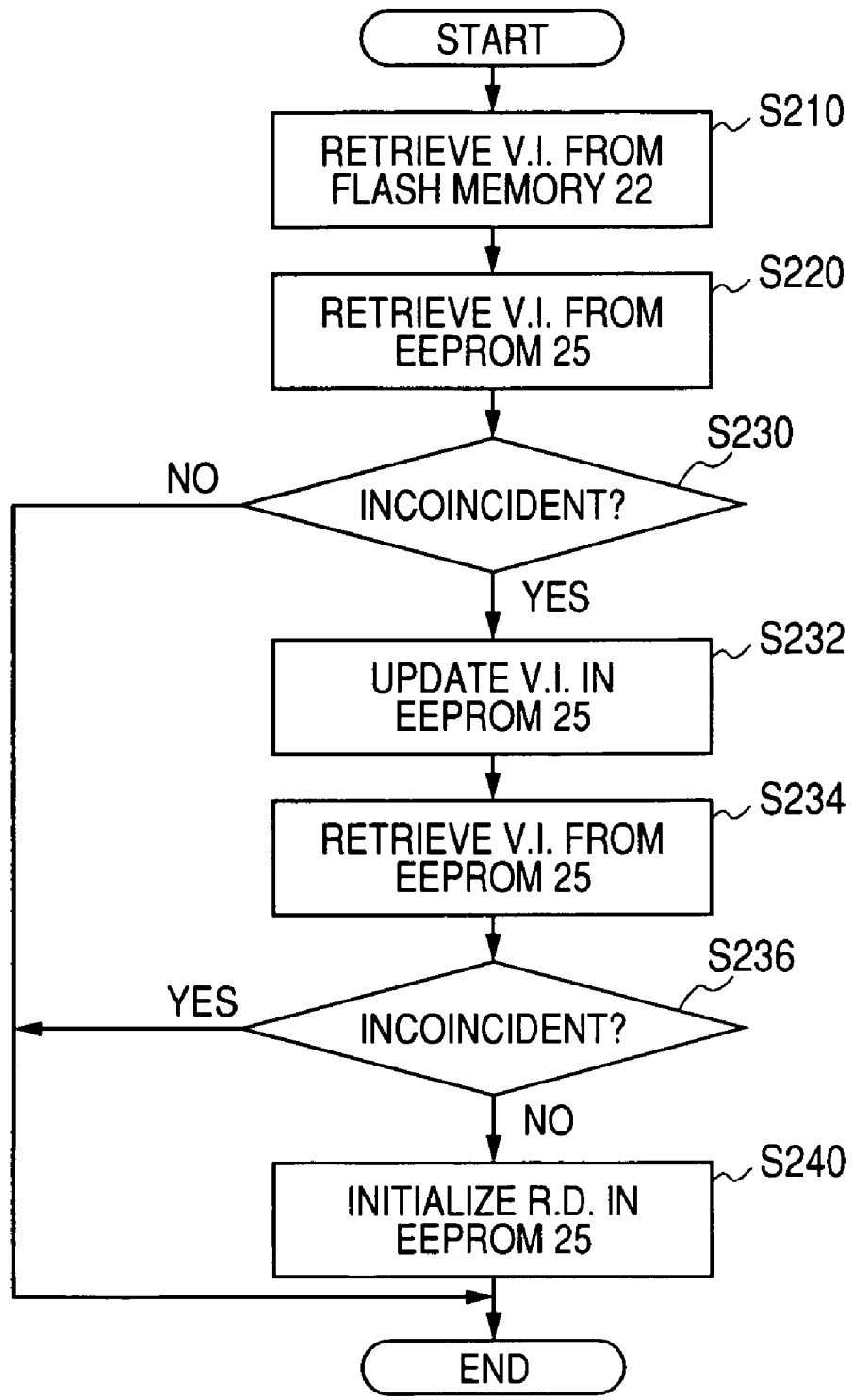
FIG. 12 is a flow chart illustrating a variation of the initialization control process of FIG. 3B.

The ECU 1 of the first embodiment can be modified to perform, instead of the initialization control process shown in FIG. 3B, an initialization control process shown in FIG. 12.

The initialization control process of FIG. 12 is derived from the initialization control program of FIG. 3B by adding steps S232, S234, and S236 thereto and deleting step S250 therefrom.

At step S230 of FIG. 12, the CPU 21 determines whether the version information (abbreviated to V.I. FIG. 12) retrieved from the flash memory 22 at step S210 is incoincident with that retrieved from the specific information storage area of the EEPROM 25 at step S220.

If the determination at step S230 produces a "NO" answer, i.e., if the version information retrieved from the flash memory 22 is coincident with that retrieved from the specific information storage area, then the process directly goes to the end without initializing the retention data. As a result, the CPU 21 comes to perform only the process of executing the engine control software currently stored in the flash memory 22.

On the contrary, if the determination at step S230 produces a "YES" answer, i.e., if the version information retrieved from the flash memory 22 is incoincident with that retrieved from the specific information storage area, the process proceeds to step S232.

At step S232, the CPU 21 updates the version information in the specific information storage area of the EEPROM 25 with the version information retrieved from the flash memory 22. In other words, the CPU 21 updates the version information stored in the specific information storage area with the version information on the engine control software that is currently stored in the flash memory 22.

At step S234, the CPU 21 retrieves, from the specific information storage area of the EEPROM 25, the version information that is updated at step S232 with the version retrieved from the flash memory 22.

At step S236, the CPU 21 determines whether the version information retrieved from the specific information storage area of the EEPROM 25 at step S234 is incoincident with that retrieved from the flash memory 22.

If the determination at step S236 produces a "YES" answer, then the process directly goes to the end without initializing the retention data.

More specifically, in this case, the CPU 21 diagnoses the specific information storage area of the EEPROM 25 as being in an abnormal condition, and does not initialize the retention data though the result of the determination at step S230 is positive. In other words, the CPU 21 invalidates the result of the determination at step S230.

On the contrary, if the determination at step S236 produces a "NO" answer, then the process proceeds to step S240, at which the CPU 21 initializes the retention data (abbreviated to R.D. in FIG. 12) in the retention data storage area of the EEPROM 25. Then, the process goes to the end.

More specifically, in this case, the CPU 21 diagnoses the specific information storage area of the EEPROM 25 as being in a normal condition, and validates the result of the determination at step S230.

Variation 2

Figure 13:
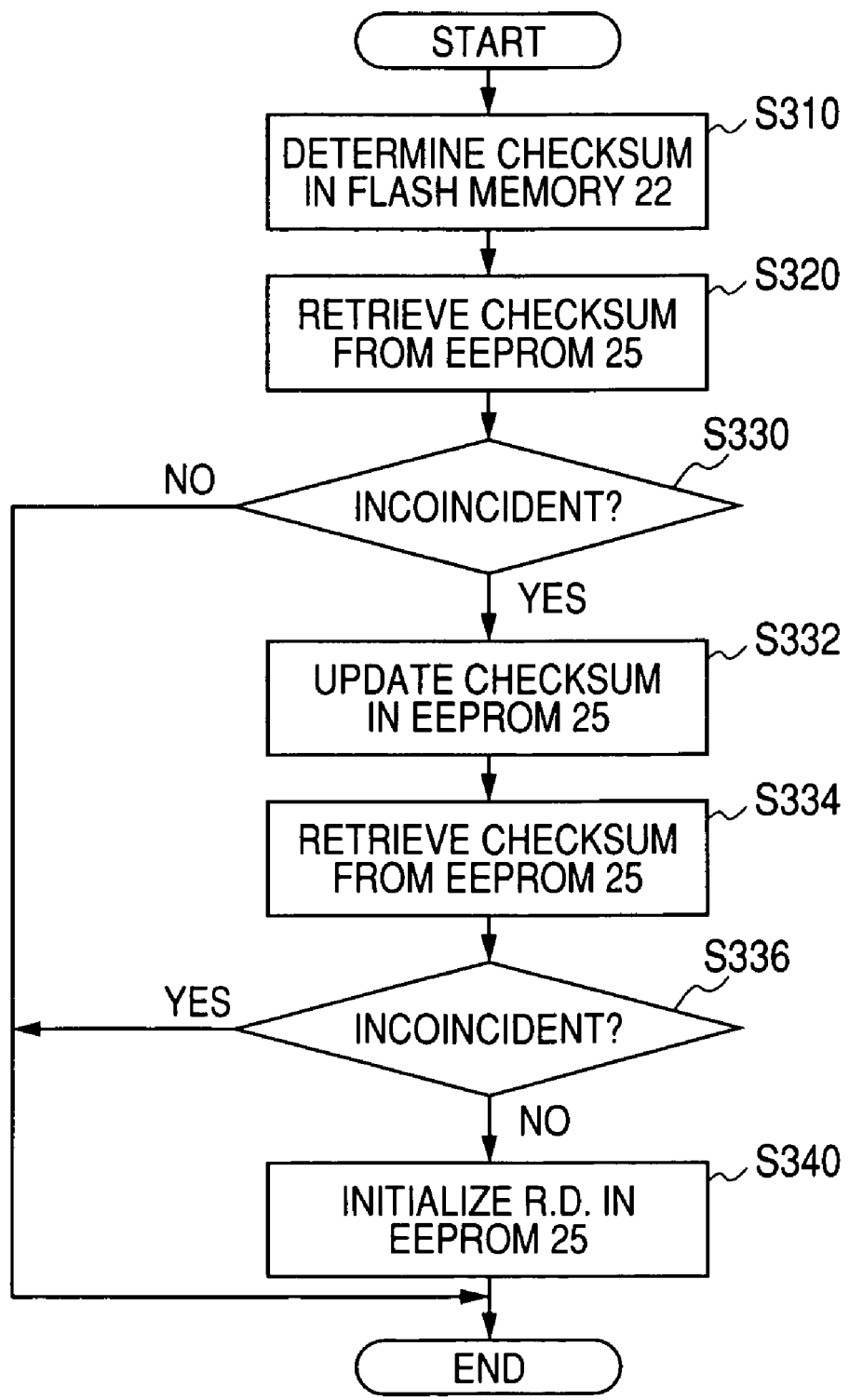
FIG. 13 is a flow chart illustrating a variation of the initialization control process of FIG. 5.

The ECU 1A of the second embodiment can be modified to perform, instead of the initialization control process shown in FIG. 5, an initialization control process shown in FIG. 13.

The initialization control process of FIG. 13 is derived from the initialization control process of FIG. 5 by adding steps S332, S334, and S336 thereto and deleting step S350 therefrom.

At step S330 of FIG. 13, the CPU 21 determines whether the checksum determined at step S310 is incoincident with that retrieved from the specific information storage area of the EEPROM 25 at step S320.

If the determination at step S330 produces a "NO" answer, i.e., if the checksum retrieved from the flash memory 22 is coincident with that retrieved from the specific information storage area, then the process directly goes to the end without initializing the retention data. As a result, the CPU 21 comes to perform only the process of executing the engine control software currently stored in the flash memory 22.

On the contrary, if the determination at step S330 produces a "YES" answer, i.e., if the checksum retrieved from the flash memory 22 is incoincident with that retrieved from the specific information storage area, the process proceeds to step S332.

At step S332, the CPU 21 updates the checksum in the specific information storage area of the EEPROM 25 with the checksum retrieved from the flash memory 22. In other words, the CPU 21 updates the checksum stored in the specific information storage area with the checksum on the engine control software that is currently stored in the flash memory 22.

At step S334, the CPU 21 retrieves, from the specific information storage area of the EEPROM 25, the checksum that is updated at step S332 with the checksum retrieved from the flash memory 22.

At step S336, the CPU 21 determines whether the checksum retrieved from the specific information storage area of the EEPROM 25 at step S334 is incoincident with that retrieved from the flash memory 22.

If the determination at step S336 produces a "YES" answer, then the process directly goes to the end without initializing the retention data.

More specifically, in this case, the CPU 21 diagnoses the specific information storage area of the EEPROM 25 as being in an abnormal condition, and doses not initialize the retention data though the result of the determination at step S330 is positive. In other words, the CPU 21 invalidates the result of the determination at step S330.

On the contrary, if the determination at step S336 produces a "NO" answer, then the process proceeds to step S340, at which the CPU 21 initializes the retention data (abbreviated to R.D. in FIG. 13) in the retention data storage area of the EEPROM 25. Then, the process goes to the end.

More specifically, in this case, the CPU 21 diagnoses the specific information storage area of the EEPROM 25 as being in a normal condition, and validates the result of the determination at step S330.

Variation 3

Figure 14:
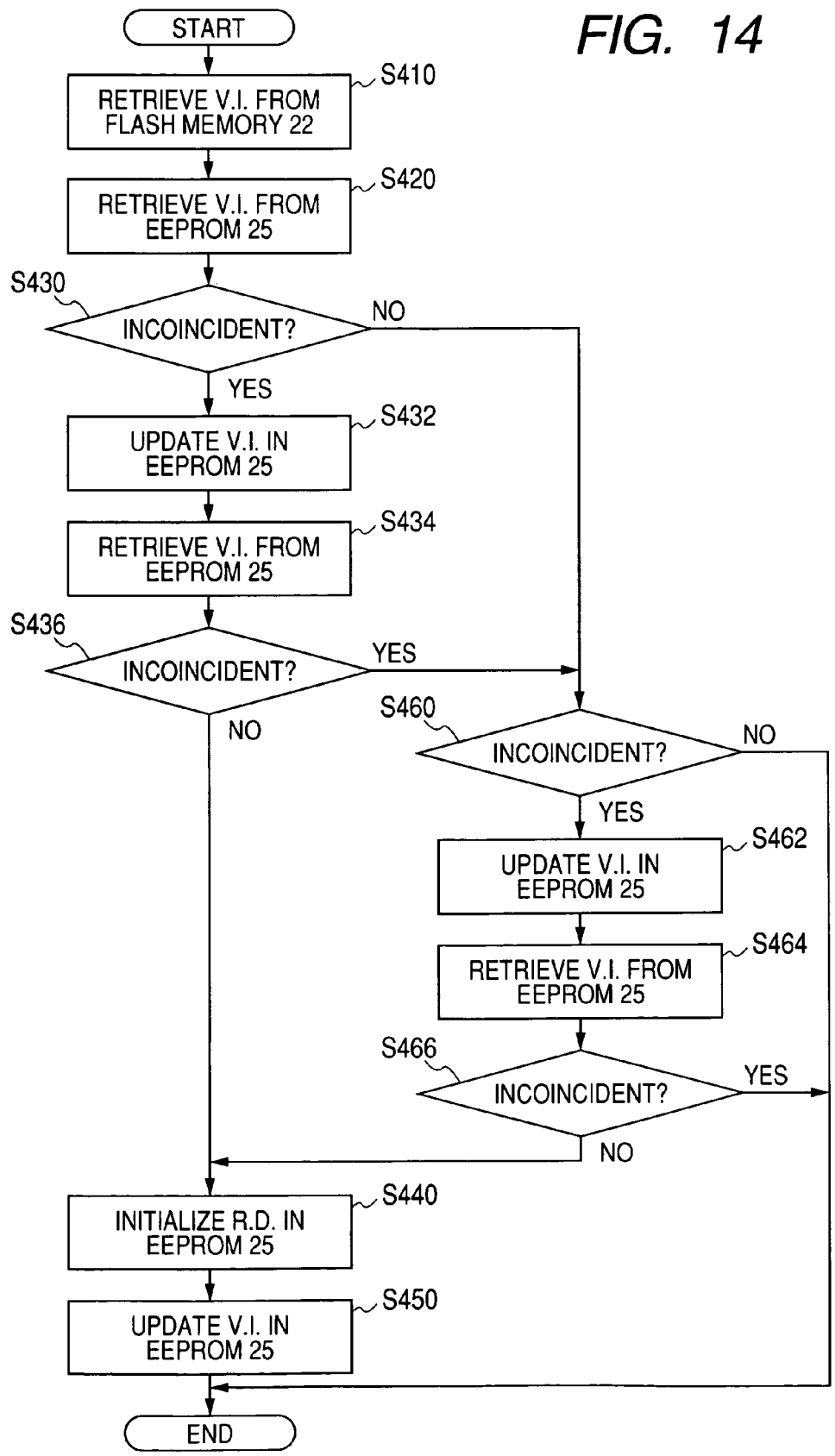
FIG. 14 is a flow chart illustrating a variation of the initialization control process of FIG. 6.

The ECU 1B of the third embodiment can be modified to perform, instead of the initialization control process shown in FIG. 6, an initialization control process shown in FIG. 14.

The initialization control process of FIG. 14 is derived from the initialization control process of FIG. 6 by adding steps S432, S434, S436, S462, S464, and S466 thereto.

At step S430 of FIG. 14, the CPU 21 determines whether the version information (abbreviated to V.I. in FIG. 14) retrieved from the flash memory 22 at step S410 is incoincident with that retrieved from one of the two specific information storage areas of the EEPROM 25 at step S420.

If the determination at step S430 produces a "NO" answer, then the process proceeds to step S460. On the contrary, if the determination at step S430 produces a "YES" answer, then the process goes on to step S432.

At step S432, the CPU 21 updates the version information in the one of the specific information storage areas of the EEPROM 25 with the version information retrieved from the flash memory 22.

At step S434, the CPU 21 retrieves, from the one of the specific information storage areas of the EEPROM 25, the version information that is updated at step S432 with the version information retrieved from the flash memory 22.

At step S436, the CPU 21 determines whether the version information retrieved from the one of the specific information storage areas of the EEPROM 25 at step S434 is incoincident with that retrieved from the flash memory 22.

If the determination at step S436 produces a "NO" answer, then the process proceeds to step S440, at which the CPU 21 initializes the retention data (abbreviated to R.D. in FIG. 14) in the retention data storage area of the EEPROM 25. At step S450, the CPU 21 updates all the version information in the specific information storage areas of the EEPROM 25 with the version information retrieved from the flash memory 22. Then, the process goes to the end.

More specifically, in this case, the CPU 21 diagnoses the one of the specific information storage areas of the EEPROM 25 as being in a normal condition, and validates the result of the determination at step S430.

On the contrary, if the determination at step S436 produces a "YES" answer, then the process goes on to step S460.

More specifically, in this case, the CPU 21 diagnoses the one of the specific information storage areas of the EEPROM 25 as being in an abnormal condition, and does not proceed to initialize the retention data though the result of the determination at step S430 is positive. In other words, the CPU 21 invalidates the result of the determination at step S430.

At step S460, the CPU 21 further determines whether the version information retrieved from the flash memory 22 is incoincident with that retrieved from the other specific information storage area of the EEPROM 25 at step S420.

If the determination at step S460 produces a "NO" answer, then the process directly goes to the end without initializing the retention data. On the contrary, if the determination at step S460 produces a "YES" answer, then the process proceeds to step S462.

At step S462, the CPU 21 updates the version information in the other specific information storage area of the EEPROM 25 with the version information retrieved from the flash memory 22.

At step S464, the CPU 21 retrieves, from the other specific information storage area of the EEPROM 25, the version information that is updated at step S462 with the version information retrieved from the flash memory 22.

At step S466, the CPU 21 determines whether the version information retrieved from the other specific information storage area of the EEPROM 25 at step S464 is incoincident with that retrieved from the flash memory 22.

If the determination at step S466 produces a "NO" answer, then the process proceeds to step S440 to initialize the retention data.

More specifically, in this case, the CPU 21 diagnoses the other specific information storage area of the EEPROM 25 as being in a normal condition, and validates the result of the determination at step S460.

On the contrary, if the determination at step S466 produces a "YES" answer, then the process directly goes to the end.

More specifically, in this case, the CPU 21 diagnoses the other specific information storage area of the EEPROM 25 as being in an abnormal condition, and does not proceed to initialize the retention data though the result of the determination at step S460 is positive. In other words, the CPU 21 invalidates the result of the determination at step S460.

In addition, it is also possible to combine the above-described initialization control process of FIG. 14 with that of FIG. 5 described in the second embodiment. More specifically, in this case, the checksum is used instead of the version information on the engine control software.

Variation 4

Figure 15:
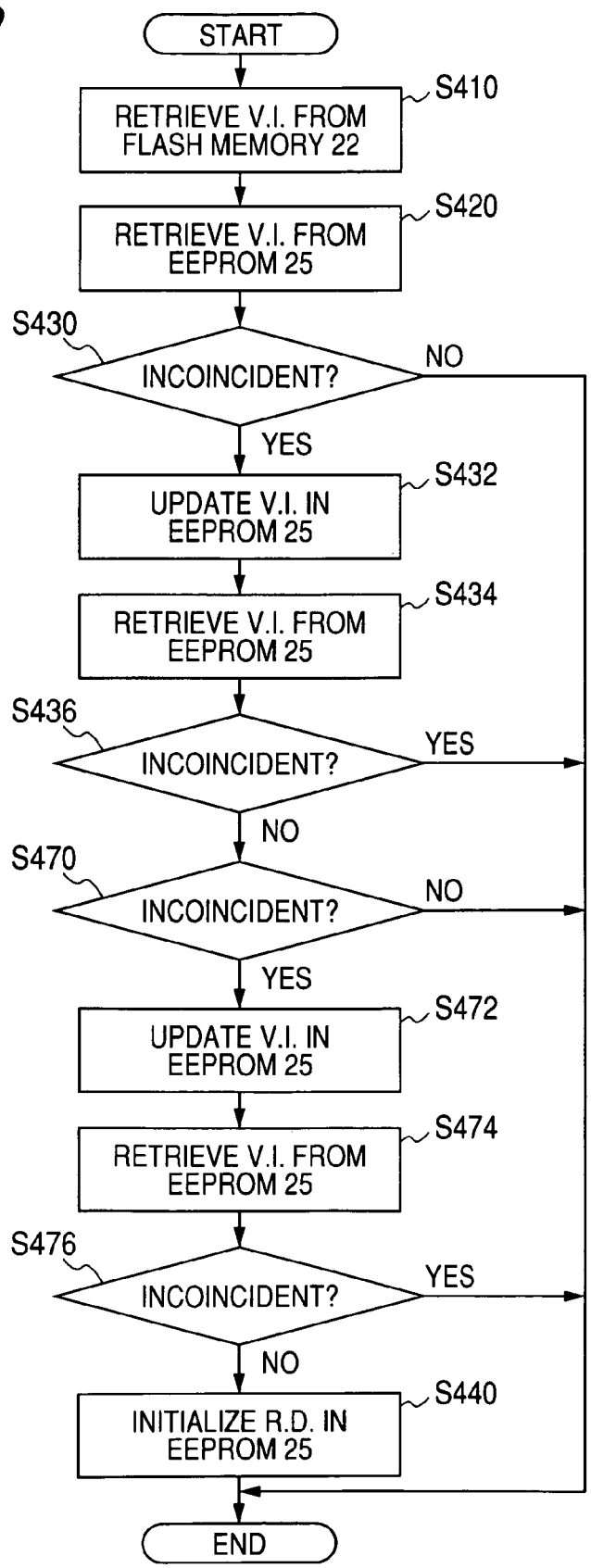
FIG. 15 is a flow chart illustrating a variation of the initialization control process of FIG. 7.

The ECU 1C of the fourth embodiment can be modified to perform, instead of the initialization control process shown in FIG. 7, an initialization control process shown in FIG. 15.

The initialization control process of FIG. 15 is derived from the initialization control process of FIG. 7 by adding steps S432, S434, S436, S472, S474, and S476 thereto and deleting step S450.

At step S430 of FIG. 15, the CPU 21 determines whether the version information (abbreviated to V.I. in FIG. 15) retrieved from the flash memory 22 at step S410 is incoincident with that retrieved from one of the two specific information storage areas of the EEPROM 25 at step S420.

If the determination at step S430 produces a "NO" answer, then the process directly goes to the end without initializing the retention data. On the contrary, if the determination at step S430 produces a "YES" answer, then the process proceeds to step S432.

At step S432, the CPU 21 updates the version information in the one of the specific information storage areas of the EEPROM 25 with the version information retrieved from the flash memory 22.

At step S434, the CPU 21 retrieves, from the one of the specific information storage areas of the EEPROM 25, the version information that is updated at step S432 with the version information retrieved from the flash memory 22.

At step S436, the CPU 21 determines whether the version information retrieved from the one of the specific information storage areas of the EEPROM 25 at step S434 is incoincident with that retrieved from the flash memory 22.

If the determination at step S436 produces a "YES" answer, then the process directly goes to the end.

More specifically, in this case, the CPU 21 diagnoses the one of the specific information storage areas of the EEPROM 25 as being in an abnormal condition, and does not proceed to initialize the retention data though the result of the determination at step S430 is positive. In other words, the CPU 21 invalidates the result of the determination at step S430.

On the contrary, if the determination at step S436 produces a "NO" answer, then the process proceeds to step S470.

More specifically, in this case, the CPU 21 diagnoses the one of the specific information storage areas of the EEPROM 25 as being in a normal condition, and validates the result of the determination at step S430.

At step S470, the CPU 21 further determines whether the version information retrieved from the flash memory 22 is incoincident with that retrieved from the other specific information storage area of the EEPROM 25 at step S420.

If the determination at step S470 produces a "NO" answer, then the process directly goes to the end without initializing the retention data. On the contrary, if the determination at step S470 produces a "YES" answer, then the process proceeds to step S472.

At step S472, the CPU 21 updates the version information in the other specific information storage area of the EEPROM 25 with the version information retrieved from the flash memory 22.

At step S474, the CPU 21 retrieves, from the other specific information storage area of the EEPROM 25, the version information that is updated at step S472 with the version information retrieved from the flash memory 22.

At step S476, the CPU 21 determines whether the version information retrieved from the other specific information storage area of the EEPROM 25 at step S474 is incoincident with that retrieved from the flash memory 22.

If the determination at step S476 produces a "NO" answer, then the process proceeds to step S440, at which the CPU 21 initializes the retention data (abbreviated to R.D. in FIG. 15) in the retention data storage area of the EEPROM 25. Then, the process goes to the end.

More specifically, in this case, the CPU 21 diagnoses the other specific information storage area of the EEPROM 25 as being in a normal condition, and validates the result of the determination at step S470.

On the contrary, if the determination at step S476 produces a "YES" answer, then the process directly goes to the end.

More specifically, in this case, the CPU 21 diagnoses the other specific information storage area of the EEPROM 25 as being in an abnormal condition, and does not proceed to initialize the retention data though the result of the determination at step S470 is positive. In other words, the CPU 21 invalidates the result of the determination at step S470.

In addition, it is also possible to combine the above-described initialization control process of FIG. 15 with that of FIG. 5 described in the second embodiment. More specifically, in this case, the checksum is used instead of the version information on the engine control software.

Furthermore, it is also possible to combine either of the initialization control processes shown in FIGS. 12-15 with either of the initialization control processes according to the fifth to seventh embodiments of the invention.

While the above particular embodiments of the present invention and their variations have been shown and described, it will be understood by those skilled in the art that various further modifications, changes, and improvements may be made without departing from the spirit of the invention.

For example, in the previous embodiments, the retention data is stored in the EEPROM 25.

However, the retention data may also be stored in the power-backed up RAM 24, thereby speeding up the process of initializing retention data.

In the previous embodiments, the retention data and the piece of specific information (i.e., the version or checksum) on the engine control software are stored in the same storage device, i.e., the EEPROM 25. Specifically, the retention data and the piece of specific information are respectively stored in the retention data storage area and specific information storage area(s) of the EEPROM 25.

However, the retention data and the piece of specific information may also be respectively stored in different storage devices, for example the retention data in the power-backed up RAM 24 and the piece of specific information in the EEPROM 25.

In the second embodiment, the checksum is used as the piece of specific information on the engine control software.

However, any other specific value to the engine control software may also be used as the piece of specific information on the engine control software.

In the first embodiment, the process of rewriting the engine control software is accomplished via the communication line 11 and connector 13 between the ECU 1 and the program rewrite tool 15.

However, the process of rewriting the engine control software may also be accomplished via wireless communication between the ECU 1 and the program rewrite tool 15.

What is claimed is:

1. An electronic control apparatus comprising:
a first storage means which is electrically rewritable and nonvolatile and in which engine control software for controlling an engine of a motor vehicle is stored;
a second storage means whose contents are retainable when power to the electronic control apparatus is removed; and
a processor that performs processes of
executing the engine control software stored in the first storage means to control the engine,
storing in the second storage means retention data that is generated through execution of the engine control software and to be retained even when power to the electronic control apparatus is removed, and
rewriting the engine control software stored in the first storage means with engine control software sent from an external device or circuit upon receipt of a rewrite request from the external device or circuit,
wherein
the electronic control apparatus further comprises a third storage means whose contents are retainable when power to the electronic control apparatus is removed and in which a piece of specific information on the engine control software is stored,
the processor further performs, when the electronic control apparatus is activated, an initialization control process which includes processes of
extracting a piece of specific information on the engine control software from the first storage means,
determining whether or not the piece of specific information extracted from the first storage means is coincident with that stored in the third storage means,
initializing the retention data stored in the second storage means when the piece of specific information extracted from the first storage means is determined as being incoincident with that stored in the third storage means, and
updating the piece of specific information stored in the third storage means with that extracted from the first storage means after completion of the initializing process, and
the processor starts performing the process of executing the engine control software stored in the first storage means before completion of the initialization control process.

2. The electronic control apparatus as set forth in claim 1, wherein when the electronic control apparatus is activated, the processor starts performing the process of executing the engine control software in parallel with the initialization control process.

3. The electronic control apparatus as set forth in claim 1, wherein in the initializing process, the processor first initializes engine start control data that is a part of the retention data and necessary for controlling start of the engine,
when the piece of specific information extracted from the first storage means is determined in the determining process as being incoincident with that stored in the third storage means, the processor starts performing the process of executing the engine control software in parallel with the initialization control process upon completion of the initialization of the engine start control data, and when the piece of specific information extracted from the first storage means is determined in the determining process as being coincident with that stored in the third storage means, the processor starts performing only the process of executing the engine control software upon completion of the determining process.

4. The electronic control apparatus as set forth in claim 1, wherein the piece of specific information is version information indicating a version of the engine control software,
   in the rewriting process, the processor also rewrites in the first storage means the version information on the engine control software stored in the first storage means with version information indicating a version of the engine control software sent from the external device or circuit, and
   in the extracting process, the processor extracts from the first storage means the version information on the engine control software as the piece of specific information extracted from the first storage means.

5. The electronic control apparatus as set forth in claim 1, wherein the piece of specific information is a specific value to the engine control software, and
   in the extracting process, the processor determines the specific value by performing a predetermined computation on data that is included in a specific area of the engine control software, and retrieves the determined specific value as the piece of specific information extracted from the first storage means.

6. The electronic control apparatus as set forth in claim 1, further comprising one or more third storage means in each of which a piece of specific information on the engine control software is stored,
   wherein the processor determines, in the determining process, whether the piece of specific information extracted from the first storage means is incoincident with at least one of the pieces of specific information stored in all the third storage means, and
   when the piece of specific information extracted is determined as being incoincident with at least one of the pieces of specific information stored, the processor initializes, in the initializing process, the retention data stored in the second storage means and updates, in the updating process, all the pieces of specific information stored in the third storage means with the specific information extracted from the first storage means.

7. The electronic control apparatus as set forth in claim 1, further comprising one or more third storage means in each of which a piece of specific information on the engine control software is stored,
   wherein the processor determines, in the determining process, whether the piece of specific information extracted from the first storage means is incoincident with each of the pieces of specific information stored in all the third storage means, and
   when the piece of specific information extracted is determined as being incoincident with each of the pieces of specific information stored, the processor initializes, in the initializing process, the retention data stored in the second storage means and updates, in the updating process, all the pieces of specific information stored in the third storage means with the specific information extracted from the first storage means.

8. The electronic control apparatus as set forth in claim 1, further comprising a diagnosis means for diagnosing whether the third storage means is in a normal or an abnormal condition,
   wherein when the third storage means is diagnosed as being in an abnormal condition, the processor invalidates a result of the process of determining whether or not the piece of specific information extracted from the first storage means is coincident with that stored in the third storage means.

9. The electronic control apparatus as set forth in claim 1, further comprising at least a fourth storage means in each of which a piece of specific information on the engine control software is stored,
   wherein the processor determines, in the determining process, whether the piece of specific information extracted from the first storage means is incoincident with at least one of the pieces of specific information stored in all the third and fourth storage means, and
   when the piece of specific information extracted is determined as being incoincident with at least one of the pieces of specific information stored, the processor initializes, in the initializing process, the retention data stored in the second storage means and updates, in the updating process, all the pieces of specific information stored in the third and fourth storage means with the specific information extracted from the first storage means.

10. The electronic control apparatus as set forth in claim 1, further comprising at least a fourth storage means in each of which a piece of specific information on the engine control software is stored,
   wherein the processor determines, in the determining process, whether the piece of specific information extracted from the first storage means is incoincident with each of the pieces of specific information stored in all the third and fourth storage means, and
   when the piece of specific information extracted is determined as being incoincident with each of the pieces of specific information stored, the processor initializes, in the initializing process, the retention data stored in the second storage means and updates, in the updating process, all the pieces of specific information stored in the third and fourth storage means with the specific information extracted from the first storage means.

11. An electronic control apparatus comprising:
   a first storage means which is electrically rewritable and nonvolatile and in which engine control software for controlling an engine of a motor vehicle is stored;
   a second storage means whose contents are retainable when power to the electronic control apparatus is removed; and
   a processor that performs processes of
   executing the engine control software stored in the first storage means to control the engine,
   storing in the second storage means retention data that is generated through execution of the engine control software and to be retained even when power to the electronic control apparatus is removed, and
   rewriting the engine control software stored in the first storage means with engine control software sent from an external device or circuit upon receipt of a rewrite request from the external device or circuit,
   wherein
   the engine control software includes a plurality of functional blocks each of which is for performing a specific function,
   the retention data includes a plurality of retention data blocks each of which is associated with one of the functional blocks of the engine control software, the electronic control apparatus further comprises a plurality of third storage means whose contents are retainable when power to the electronic control apparatus is removed and in each of which a piece of specific information on a corresponding one of the functional blocks of the engine control software is stored, when the electronic control apparatus is activated, the processor further performs, for each of the functional blocks of the engine control software, an initialization control process which includes processes of extracting a piece of specific information on the functional block of the engine control software from the first storage means, determining whether or not the piece of specific information extracted from the first storage means is coincident with that stored in the corresponding one of the third storage means, initializing the associated one of the retention data blocks in the second storage means when the piece of specific information extracted from the first storage means is determined as being incoincident with that stored in the corresponding one of the third storage means, and updating the piece of specific information stored in the corresponding one of the third storage means with that extracted from the first storage means upon completion of the initializing process, and the processor starts performing the process of executing the engine control software stored in the first storage means before completion of all the initialization control processes for the functional blocks of the engine control software.

12. The electronic control apparatus as set forth in claim 11, wherein when the electronic control apparatus is activated, the processor starts performing the process of executing the engine control software in parallel with the initialization control process for each of the functional blocks of the engine control software.

13. The electronic control apparatus as set forth in claim 11, wherein when the electronic control apparatus is activated, the processor first performs the initialization control process for one of the functional blocks of the engine control software which is associated with one of the retention data blocks which includes data necessary for controlling start of the engine, and then starts performing the process of executing the engine control software in parallel with the initialization control process for each of the remaining functional blocks of the engine control software.

14. The electronic control apparatus as set forth in claim 11, wherein for each of the functional blocks of the engine control software, the piece of specific information on the functional block is version information indicating a version of the functional block, in the rewriting process, the processor also rewrites in the first storage means, for each of the functional blocks of the engine control software stored in the first storage means, the version information on the functional block with version information indicating a version of a corresponding functional block of the engine control software sent from the external device or circuit, and in the initialization control process for each of the functional blocks of the engine control software, the processor extracts from the first storage means the version information on the functional block as the piece of specific information extracted from the first storage means.

15. The electronic control apparatus as set forth in claim 11, wherein for each of the functional blocks of the engine control software, the piece of specific information on the functional block is a specific value to the functional block, and in the initialization control process for each of the functional blocks of the engine control software, the processor determines the specific value to the functional block by performing a predetermined computation on the functional block, and retrieves the determined specific value as the piece of specific information extracted from the first storage means.

16. The electronic control apparatus as set forth in claim 11, further comprising, for each of the functional blocks of the engine control software, one or more third storage means in each of which a piece of specific information on the functional block is stored, wherein in the initialization control process for each of the functional blocks of the engine control software, the processor determines whether the piece of specific information on the functional block extracted from the first storage means is incoincident with at least one of the pieces of specific information stored in all the third storage means for the functional block, and when the piece of specific information extracted is determined as being incoincident with at least one of the pieces of specific information stored, the processor initializes the associated one of the retention data blocks in the second storage means and updates all the pieces of specific information stored in the third storage means for the functional block with the piece of specific information on the functional block extracted from the first storage means.

17. The electronic control apparatus as set forth in claim 11, further comprising, for each of the functional blocks of the engine control software, one or more third storage means in each of which a piece of specific information on the functional block is stored, wherein in the initialization control process for each of the functional blocks of the engine control software, the processor determines whether the piece of specific information on the functional block extracted from the first storage means is incoincident with each of the pieces of specific information stored in all the third storage means for the functional block, and when the piece of specific information extracted is determined as being incoincident with each of the pieces of specific information stored, the processor initializes the associated one of the retention data blocks in the second storage means and updates all the pieces of specific information stored in the third storage means for the functional block with the piece of specific information on the functional block extracted from the first storage means.

18. The electronic control apparatus as set forth in claim 11, further comprising a diagnosis means for diagnosing whether each of the third storage means is in a normal or an abnormal condition, wherein when one of the third storage means is diagnosed as being in an abnormal condition, the processor invalidates a result of the process of determining whether or not the piece of specific information on the corresponding one of the functional blocks of the engine control software extracted from the first storage means is coincident with that stored in the one of the third storage means.

19. The electronic control apparatus as set forth in claim 11, further comprising, for each of the functional blocks of the engine control software, at least a fourth storage means in each of which a piece of specific information on the functional block is stored, wherein in the initialization control process for each of the functional blocks of the engine control software, the processor determines whether the piece of specific information on the functional block extracted from the first storage means is incoincident with at least one of the pieces of specific information stored in all the third and fourth storage means for the functional block, and when the piece of specific information extracted is determined as being incoincident with at least one of the pieces of specific information stored, the processor initializes the associated one of the retention data blocks in the second storage means and updates all the pieces of specific information stored in the third and fourth storage means for the functional block with the piece of specific information on the functional block extracted from the first storage means.

20. The electronic control apparatus as set forth in claim 11, further comprising, for each of the functional blocks of the engine control software, at least a fourth storage means in each of which a piece of specific information on the functional block is stored, wherein in the initialization control process for each of the functional blocks of the engine control software, the processor determines whether the piece of specific information on the functional block extracted from the first storage means is incoincident with each of the pieces of specific information stored in all the third and fourth storage means for the functional block, and when the piece of specific information extracted is determined as being incoincident with each of the pieces of specific information stored, the processor initializes the associated one of the retention data blocks in the second storage means and updates all the pieces of specific information stored in the third and fourth storage means for the functional block with the piece of specific information on the functional block extracted from the first storage means.

\* \* \* \* \*